(12) United States Patent
Kibler et al.

(10) Patent No.: US 12,252,949 B2
(45) Date of Patent: Mar. 18, 2025

(54) FLUID CONNECTION ASSEMBLY WITH ADAPTER RELEASE

(71) Applicant: FHE USA LLC, Fruita, CO (US)

(72) Inventors: Matthew E. Kibler, Grand Junction, CO (US); Kyle Scholl, Peoria, IL (US); Keith C. Johansen, Fruita, CO (US); Nicolas G. Snoke, Grand Junction, CO (US); Steven M. Hutchinson, Fruita, CO (US)

(73) Assignee: FHE USA LLC, Fruita, CO (US)

( * ) Notice: Subject to any disclaimer, the term of this patent is extended or adjusted under 35 U.S.C. 154(b) by 138 days.

(21) Appl. No.: 18/311,536

(22) Filed: May 3, 2023

(65) Prior Publication Data

US 2023/0272687 A1  Aug. 31, 2023

Related U.S. Application Data

(63) Continuation-in-part of application No. 17/127,425, filed on Dec. 18, 2020, now Pat. No. 11,692,408, (Continued)

(51) Int. Cl.
*E21B 33/038* (2006.01)
*E21B 17/046* (2006.01)
(Continued)

(52) U.S. Cl.
CPC .......... *E21B 33/038* (2013.01); *E21B 17/046* (2013.01); *E21B 23/02* (2013.01);
(Continued)

(58) Field of Classification Search
CPC .... E21B 33/038; E21B 17/046; F16L 37/002; F16L 37/127; F16L 37/096
(Continued)

(56) References Cited

U.S. PATENT DOCUMENTS 2,962,096 A    11/1960   Knox
3,096,999 A     7/1963   Ahlstone et al.
(Continued)

FOREIGN PATENT DOCUMENTS

GB        2147072 A    5/1985
WO    2016106176 A2   6/2016
(Continued)

OTHER PUBLICATIONS

Forum Energy Technologies Brochure, "5-⅛ ID×10KSI Hydraulic Latch Assembly—Installation/OperationMaintenance", 24 pages.
(Continued)

*Primary Examiner* — Zachary T Dragicevich
(74) *Attorney, Agent, or Firm* — Zeman-Mullen & Ford, LLP

(57) ABSTRACT

A remotely-operated fluid connection assembly to hold higher internal pressures in larger diameters. The assembly comprises a fluid connection adapter and a fluid connection housing assembly. When the adapter enters the housing assembly: (A) locking elements on the housing assembly constrict about the adapter; and (B) a first seal section on the adapter sealingly contacts a first seal bore on the housing assembly. Progressive engagement of a locking ring tightens the locking elements against the adapter. Internal pressure further tightens the adapter against the locking elements and the first seal section against the first seal bore. The fluid connection adapter also provides a release collar in adapter release embodiments. Extension of the locking ring away from the fluid connection housing during disengagement contacts the release collar and separates the fluid connection adapter from the fluid connection housing assembly.

20 Claims, 25 Drawing Sheets

Related U.S. Application Data which is a continuation of application No. 16/677,428, filed on Nov. 7, 2019, now Pat. No. 10,907,435, which is a continuation of application No. 16/221,279, filed on Dec. 14, 2018, now Pat. No. 10,550,659.

(60) Provisional application No. 63/337,976, filed on May 3, 2022, provisional application No. 62/649,008, filed on Mar. 28, 2018.

(51) Int. Cl.
*E21B 23/02* (2006.01)
*E21B 33/035* (2006.01)
*E21B 33/06* (2006.01)
*F16L 37/00* (2006.01)
*F16L 37/096* (2006.01)
*F16L 37/127* (2006.01)

(52) U.S. Cl.
CPC ............ *E21B 33/06* (2013.01); *F16L 37/002* (2013.01); *E21B 33/0355* (2013.01); *F16L 37/096* (2013.01); *F16L 37/127* (2013.01)

(58) Field of Classification Search
USPC .......................... 285/315, 920; 166/338, 368
See application file for complete search history.

(56) References Cited

U.S. PATENT DOCUMENTS

| | | |
|---|---|---|
| 3,452,815 A | 7/1969 | Watkins |
| 3,486,556 A | 12/1969 | Burgess |
| 3,608,932 A | 9/1971 | Brown |
| 3,661,409 A | 5/1972 | Brown et al. |
| 3,709,623 A | 1/1973 | Stephan et al. |
| 3,841,665 A | 10/1974 | Capot |
| 3,874,706 A | 4/1975 | Arnold |
| 4,153,278 A | 5/1979 | Ahlstone |
| 4,209,040 A | 6/1980 | Peters |
| 4,225,160 A | 9/1980 | Ortloff |
| 4,441,742 A | 4/1984 | Owens, III |
| 4,526,406 A | 7/1985 | Nelson |
| 4,557,508 A | 12/1985 | Walker |
| 4,646,827 A | 3/1987 | Cobb |
| 4,651,830 A | 3/1987 | Crotwell |
| 4,667,986 A | 5/1987 | Johnson et al. |
| 4,673,041 A | 6/1987 | Turner et al. |
| 4,730,853 A | 3/1988 | Gjessing |
| 4,815,770 A | 3/1989 | Hyne et al. |
| 5,052,439 A | 10/1991 | Smith, III |
| 5,099,882 A | 3/1992 | Smith, III |
| 5,114,117 A | 5/1992 | Appleford et al. |
| 5,279,369 A | 1/1994 | Brammer |
| 5,282,655 A | 2/1994 | Marietta |
| 5,479,960 A | 1/1996 | Kirkman |
| 5,509,476 A | 4/1996 | Vick, Jr. |
| 5,658,018 A | 8/1997 | Hjertjolm |
| 5,771,927 A | 6/1998 | Johansen et al. |
| 6,125,939 A | 10/2000 | Abreo, Jr. |
| 6,129,149 A | 10/2000 | Beall |
| 6,397,948 B1 | 6/2002 | Williams et al. |
| 6,499,773 B1 | 12/2002 | Ostergaard |
| 6,609,734 B1 | 8/2003 | Baugh |
| 7,159,652 B2 | 1/2007 | McGuire et al. |
| 7,740,061 B2 | 6/2010 | Van Bilderbeek et al. |
| 8,272,444 B2 | 9/2012 | Baugh |
| 8,474,537 B2 | 7/2013 | Voss et al. |
| 8,511,387 B2 | 8/2013 | Fraser et al. |
| 8,746,345 B2 | 6/2014 | Kotrla et al. |
| 9,334,705 B1 | 5/2016 | Ward et al. |
| 9,416,894 B2 | 8/2016 | Abel |
| 9,644,443 B1 | 5/2017 | Johansen et al. |
| 9,670,745 B1 | 6/2017 | Johansen et al. |
| 9,784,394 B2 | 10/2017 | Sannadi et al. |
| 9,879,496 B2 | 1/2018 | Johansen et al. |
| 9,939,096 B2 | 4/2018 | Tiberghien |
| 10,030,461 B2 | 7/2018 | Johansen et al. |
| 10,072,474 B2 | 9/2018 | Johansen et al. |
| 10,094,501 B2 | 10/2018 | Bull et al. |
| 10,100,597 B2 | 10/2018 | Mozisek |
| 10,107,057 B2 | 10/2018 | Niehaus |
| 10,107,433 B2 | 10/2018 | Eckard et al. |
| 10,113,384 B2 | 10/2018 | Nguyen |
| 2001/0011592 A1 | 8/2001 | Baker |
| 2003/0168857 A1 | 9/2003 | Jennings |
| 2005/0146137 A1 | 7/2005 | Davidson et al. |
| 2008/0006412 A1 | 1/2008 | Ford |
| 2008/0044221 A1 | 2/2008 | McKay et al. |
| 2010/0139925 A1 | 6/2010 | McKay et al. |
| 2011/0025044 A1 | 2/2011 | McKay |
| 2011/0079399 A1 | 4/2011 | Nguyen et al. |
| 2011/0095526 A1 | 4/2011 | Vanderford et al. |
| 2011/0266006 A1 | 11/2011 | Lacheny et al. |
| 2011/0284206 A1 | 11/2011 | Nguyen |
| 2012/0012341 A1 | 1/2012 | White et al. |
| 2012/0222865 A1 | 9/2012 | Larson et al. |
| 2013/0048309 A1 | 2/2013 | Young |
| 2013/0093179 A1 | 4/2013 | Jenkins et al. |
| 2013/0283919 A1 | 10/2013 | Coonrod et al. |
| 2013/0341539 A1 | 12/2013 | Hughes et al. |
| 2014/0034337 A1 | 2/2014 | Van Wijk |
| 2014/0144648 A1 | 5/2014 | McKay |
| 2014/0251631 A1 | 9/2014 | Curtiss, III |
| 2014/0262307 A1 | 9/2014 | Caldwell et al. |
| 2014/0352944 A1 | 12/2014 | Devarajan et al. |
| 2015/0069755 A1 | 3/2015 | Bull |
| 2015/0083430 A1 | 3/2015 | Jahnke et al. |
| 2015/0114667 A1 | 4/2015 | Mansukh et al. |
| 2016/0084066 A1 | 3/2016 | DeBerry et al. |
| 2016/0138352 A1 | 5/2016 | Leba et al. |
| 2016/0281473 A1 | 9/2016 | Delgado et al. |
| 2016/0376863 A1 | 12/2016 | Older et al. |
| 2017/0089162 A1 | 3/2017 | Barnhart et al. |
| 2017/0152721 A1 | 6/2017 | Bories et al. |
| 2017/0159390 A1 | 6/2017 | Johansen et al. |
| 2017/0183932 A1 | 6/2017 | Cotton et al. |
| 2017/0183933 A1 | 6/2017 | Nguyen |
| 2017/0218716 A1 | 8/2017 | Boulanger |
| 2017/0226846 A1 | 8/2017 | Gray et al. |
| 2017/0328145 A1 | 11/2017 | Wagoner et al. |
| 2017/0328164 A1 | 11/2017 | Partridge et al. |
| 2018/0058169 A1 | 3/2018 | Le |
| 2018/0080299 A1 | 3/2018 | Johansen et al. |
| 2018/0080590 A1 | 3/2018 | McKay |
| 2018/0128063 A1 | 5/2018 | Curry |
| 2018/0163493 A1 | 6/2018 | Le |
| 2018/0163494 A1 | 6/2018 | Le |
| 2018/0163520 A1 | 6/2018 | Navar et al. |
| 2018/0179839 A1 | 6/2018 | Nguyen |
| 2018/0252052 A1 | 9/2018 | Attiwell |
| 2018/0274707 A1 | 9/2018 | McIntyre et al. |
| 2018/0283114 A1 | 10/2018 | Cridland et al. |
| 2018/0292037 A1 | 10/2018 | Fraczek et al. |
| 2018/0298698 A1 | 10/2018 | Garro et al. |
| 2018/0298713 A1 | 10/2018 | Bull et al. |

FOREIGN PATENT DOCUMENTS

| | | |
|---|---|---|
| WO | 2016109143 A1 | 7/2016 |
| WO | 2016113284 A1 | 7/2016 |
| WO | 2016156857 A1 | 10/2016 |
| WO | 2016160195 A1 | 10/2016 |
| WO | 2016172229 A1 | 10/2016 |
| WO | 2016174473 A1 | 11/2016 |
| WO | 2017040508 A1 | 3/2017 |
| WO | 2017079801 A1 | 5/2017 |
| WO | 2017093989 A1 | 6/2017 |
| WO | 2017102219 A1 | 6/2017 |
| WO | 2017102220 A1 | 6/2017 |
| WO | 2017116869 A2 | 7/2017 |
| WO | 2017141056 A1 | 8/2017 |
| WO | 2017150982 A1 | 9/2017 |
| WO | 2017171714 A1 | 10/2017 |
| WO | 2017171853 A1 | 10/2017 |

(56) References Cited

FOREIGN PATENT DOCUMENTS

| WO | 2018044680 | A1 | 3/2018 |
|---|---|---|---|
| WO | 2018111740 | A1 | 6/2018 |
| WO | 2018111741 | A1 | 6/2018 |
| WO | 2018111882 | A1 | 6/2018 |
| WO | 2018125729 | A2 | 7/2018 |
| WO | 201856526 | A1 | 8/2018 |
| WO | 2018187719 | A1 | 10/2018 |
| WO | 2018191566 | A1 | 10/2018 |

OTHER PUBLICATIONS

Case pending in the United States Patent and Trademark Office Before the Patent Trial and Appeal Board: *Lee Specialties Inc.* v. *FHE USA LLC.*, document filed entitled "Petition for Inter Partes Review Under 35 U.S.C. Section 312 and 37 C.F.R. Section 42.104".
Case pending in the United States Patent and Trademark Office Before the Patent Trial and Appeal Board: *Lee Specialties Inc.* v. *FHE USA LLC.*, document filed entitled "Declaration of Benton Frederick Baugh, PH.D., P.E., Under 37 C.F.R. Section 1.68 In Support of Petition for Inter Parties Revew".
Case pending in the United States Patent and Trademark Office Before the Patent Trial and Appeal Board: *Lee Specialties Inc.* v. *FHE USA LLC.*, document filed entitled "Curriculum Vitae: Benton F. Baugh Ph.d., P. E., Nae", docket document No. LSI-1004.
Case pending in the United States Patent and Trademark Office Before the Patent Trial and Appeal Board: *Lee Specialties Inc.* v. *FHE USA LLC.*, document filed entitled "Declaration of Andrew M. Nelson", docket document No. LSI-1008.
Specification for Drill-Through Equipment, ANSI/API Specification 16 A, Third Edition, Jun. 2004, effective date Dec. 1, 2004.
Case pending in the United States Patent and Trademark Office Before the Patent Trial and Appeal Board: *Lee Specialties Inc.* v. *FHE USA LLC.*, document filed entitled "Declaration of Ingrid Hsieh-Yee PH.D., Under 37 C.F.R. Section 1.68", docket document No. LSI-1010.
Case pending in the United States Patent and Trademark Office Before the Patent Trial and Appeal Board: *Lee Specialties Inc.* v. *FHE USA LLC.*, document filed, Elmar, A Varco Company, "Pressure Control Equipment", www.elmar.co.uk. *Lee Specialties* v. *FHE USA*, docket document No. LSI-1012.
Case pending in the United States Patent and Trademark Office Before the Patent Trial and Appeal Board: *Lee Specialties Inc.* v. *FHE USA LLC.*, document filed, document filed entitled "Affidavit of Christopher Butler", docket document No. LSI-1013.
Case No. 5:18-cv-00715-OLG pending in the U.S. District Court for the Western District of Texas San Antonio Division: *FHE USA* v. *Lee Specialties Inc.*, document filed entitled "Plaintiff FHE USA LLC's Supplemental Repsonses and Objections to Defendant's Interrogatory No. 1", docket document No. LSI-1027.
Case No. 5:18-cv-00715-OLG pending in the U.S. District Court for the Western District of Texas San Antonio Division: *FHE USA* v. *Lee Specialties Inc.*, document filed entitled "Supplemental Exhibit A", docket document No. LSI-1028.
International Search Report and The Written Opinion of the International Searching Authority in related PCT Application No. PCT/US2018/061114 mailed on Apr. 24, 2019 (5 pages).
International Search Report and The Written Opinion of the International Searching Authority in PCT/US2019/023999 mailed Apr. 19, 2019 (6 pages).
Texas Oil Tools, Doc. No. PSB-027-PIB, Rev B, Product Service Bulletin PSBL-3.06 4.06 5.12 Hydraconn, Jun. 20, 2011, 6 pages.
Specification for Wellhead and Christmas Tree Equipment, ANSI/API Specification 6A, Twentieth Edition, Oct. 2010, effective date: Apr. 1, 2011.
FHE Product Catalog, circa 2014.
Lee Specialties Product Catalog, 2012.

Cain, D.E., et al., "Selecting Surface Wellhead Seal Mechanisms Utilizing a Needs Analysis Approach", Offshore Technology Conference paper, presented at the 21st Annual OTC in Houston, Texas on May 1-4, 1989.
Sabbagh, L., et al., "Optimizing Wireline Gun System Design and Perforating Performance for Very Late Changes in a Gulf of Mexico HPHT Deepwater Well", SPE 113727, paper presented at the 2008 SPE Europec/EAGE Annual Conference and Exhibition held in Rome, Italy, Jun. 9-12, 2008.
Torres, Carlos, et al., "Hurricane Contingency for Stuck Coiled Tubing: Preparing for Platform Evacuation and Allowing a Safe Recovery", SPE 143299, presented at the SPE/ICoTA Coiled Tubing and Well Intervention Conference and Exhibition held in the Woodlands, Texas, Apr. 5-6, 2011.
Lee Posi Lock Slides, circa 2018.
FHE materials, circa 2018.
FHE materials re OTC, circa 2018.
Case pending in the United States Patent and Trademark Office Before the Patent Trial and Appeal Board: Decision of the Patent Trial and Appeal Board dated Feb. 10, 2020, instituting review of U.S. Pat. No. 10,030,461 in PTAB Inter-Parties Review case 2019-01366.
Case No. 5:18-cv-00715-OLG pending in the U.S. District Court for the Western District of Texas San Antonio Division: *FHE USA* v. *Lee Specialties Inc.*, document filed entitled "Joint Claim Construction Chart", docket document No. 36.
Case No. 5:18-cv-715-OLG pending in the U.S. District Court for the Western District of Texas San Antonio Division: *FHE USA* v. *Lee Specialties Inc.*, document filed entitled "Defendent Lee Specialties Inc.'s Opening Claim-Construction Brief", docket document No. 38.
Case No. 5:18-cv-715-OLG pending in the U.S. District Court for the Western District of Texas San Antonio Division: *FHE USA* v. *Lee Specialties Inc.*, document filed entitled "Declaration of Benton Frederick Baugh, PH.D., P.E., Regarding Proposed Constructions and Indefiniteness of the Asserted Claims of U.S. Pat. Nos. 9,879,496 and No. 10,030,461", docket document No. 38-2.
Case No. 5:18-cv-00715-OLG pending in the U.S. District Court for the Western District of Texas San Antonio Division: *FHE USA* v. *Lee Specialties Inc.*, document filed entitled "LSI Exhibit 2B Merriam-Webster's", docket document No. 38-4.
Case No. 5:18-cv-00715-OLG pending in the U.S. District Court for the Western District of Texas San Antonio Division: *FHE USA* v. *Lee Specialties Inc.*, document filed entitled "LSI Exhibit 2C McGraw-Hill Engineering", docket document No. 38-5.
Case No. 5:18-cv-00715-OLG pending in the U.S. District Court for the Western District of Texas San Antonio Division: *FHE USA* v. *Lee Specialties Inc.*, document filed entitled "Plaintiff's Opening Claim Construction Brief", docket document No. 39.
Case No. 5:18-cv-00715-OLG pending in the U.S. District Court for the Western District of Texas San Antonio Division: *FHE USA* v. *Lee Specialties Inc.*, document filed entitled "Plaintiff FHE Inc.'s Initial Proposed Claim Constructions", docket document No. LSI-1023.
Case No. 5:18-cv-00715-OLG pending in the U.S. District Court for the Western District of Texas San Antonio Division: *FHE USA* v. *Lee Specialties Inc.*, document filed entitled "Plaintiff FHE USA Inc.'s Amended Modified Proposed Claim Constructions", docket document No. LSI-1024.
Case No. 5:18-cv-715-OLG pending in the U.S. District Court for the Western District of Texas San Antonio Division: *FHE USA* v. *Lee Specialties Inc.*, document filed entitled "Defendent Lee Specialties Inc.'s Responsive Claim-Construction Brief"; docket document No. 41.
Case No. 5:18-cv-00715-OLG pending in the U.S. District Court for the Western District of Texas San Antonio Division: *FHE USA* v. *Lee Specialties Inc.*, document filed entitled "Plaintiff's Responsive Claim Construction Brief", docket document No. 42.
Case pending in the United States Patent and Trademark Office Before the Patent Trial and Appeal Board: *Lee Specialties Inc.* v. *FHE USA LLC.*, document filed entitled "Patent Owner's Preliminary Response".

(56) References Cited

OTHER PUBLICATIONS

Case pending in the United States Patent and Trademark Office Before the Patent Trial and Appeal Board: *Lee Specialties Inc.* v. *FHE USA LLC.*, document filed entitled "Baugh Supplemental Declaration", docket document No. LSI-1033.

Case pending in the United States Patent and Trademark Office Before the Patent Trial and Appeal Board: *Lee Specialties Inc.* v. *FHE USA LLC.*, document filed entitled "Reply to Patent Owner's Preliminary Response".

Case pending in the United States Patent and Trademark Office Before the Patent Trial and Appeal Board: *Lee Specialties Inc.* v. *FHE USA LLC.*, document filed entitled "Patent Owner's Sur-Reply to Petitioner's Reply to Patent Owner's Preliminary Response".

Case No. 5:18-cv-00715-OLG pending in the U.S. District Court for the Western District of Texas San Antonio Division: *FHE USA* v. *Lee Specialties Inc.*, document filed entitled "Defendant Lee Specialties Inc.'s Supplemental Opening Claim-Construction Brief", docket document No. LSI-1032.

Case No. 5:18-cv-00715-OLG pending in the U.S. District Court for the Western District of Texas San Antonio Division: *FHE USA* v. *Lee Specialties Inc.*, document filed entitled "Defendant Lee Specialties Inc.'s Supplemental Objections and Responses to Plaintiff FHE USA LLC's First Set of Interrogatories (Nos. 4-7)", docket document No. LSI-1030.

Case No. 5:18-cv-00715-OLG pending in the U.S. District Court for the Western District of Texas San Antonio Division: *FHE USA* v. *Lee Specialties Inc.*, document filed entitled "Defendant Lee Specialties Inc.'s Supplemental Responsive Claim-Construction Brief", docket document No. LSI-1034.

Case No. 5:18-cv-00715-OLG pending in the U.S. District Court for the Western District of Texas San Antonio Division: *FHE USA* v. *Lee Specialties Inc.*, document filed entitled "Defendant Lee Specialties Inc.'s Responsive Claim-Construction Brief", docket document No. FHE-2012.

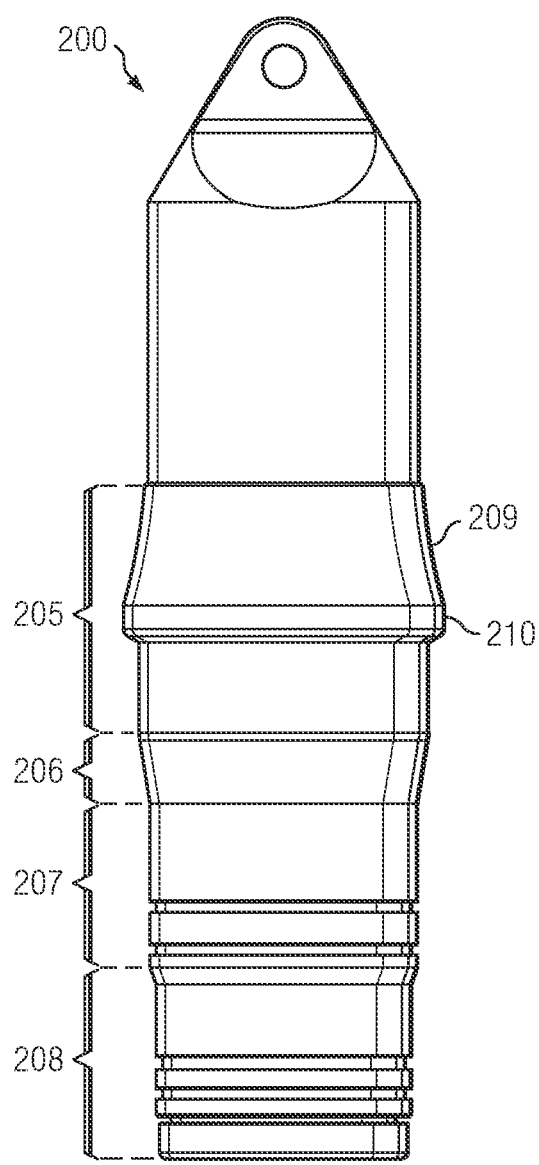
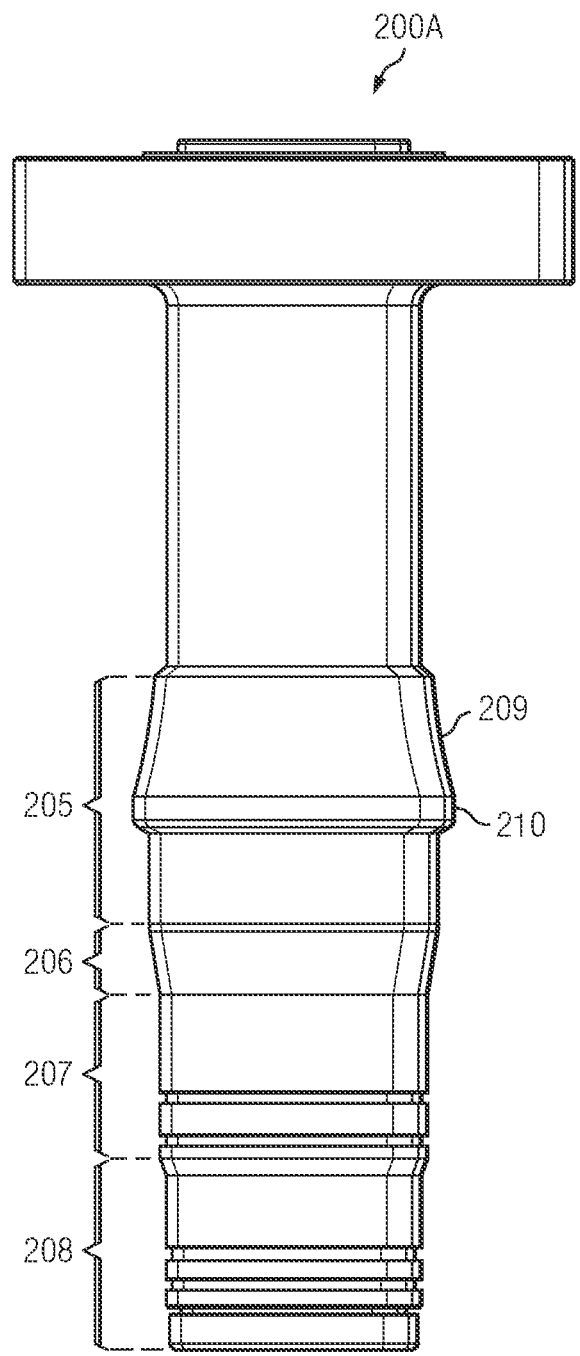
FIG. 2
FIG. 3

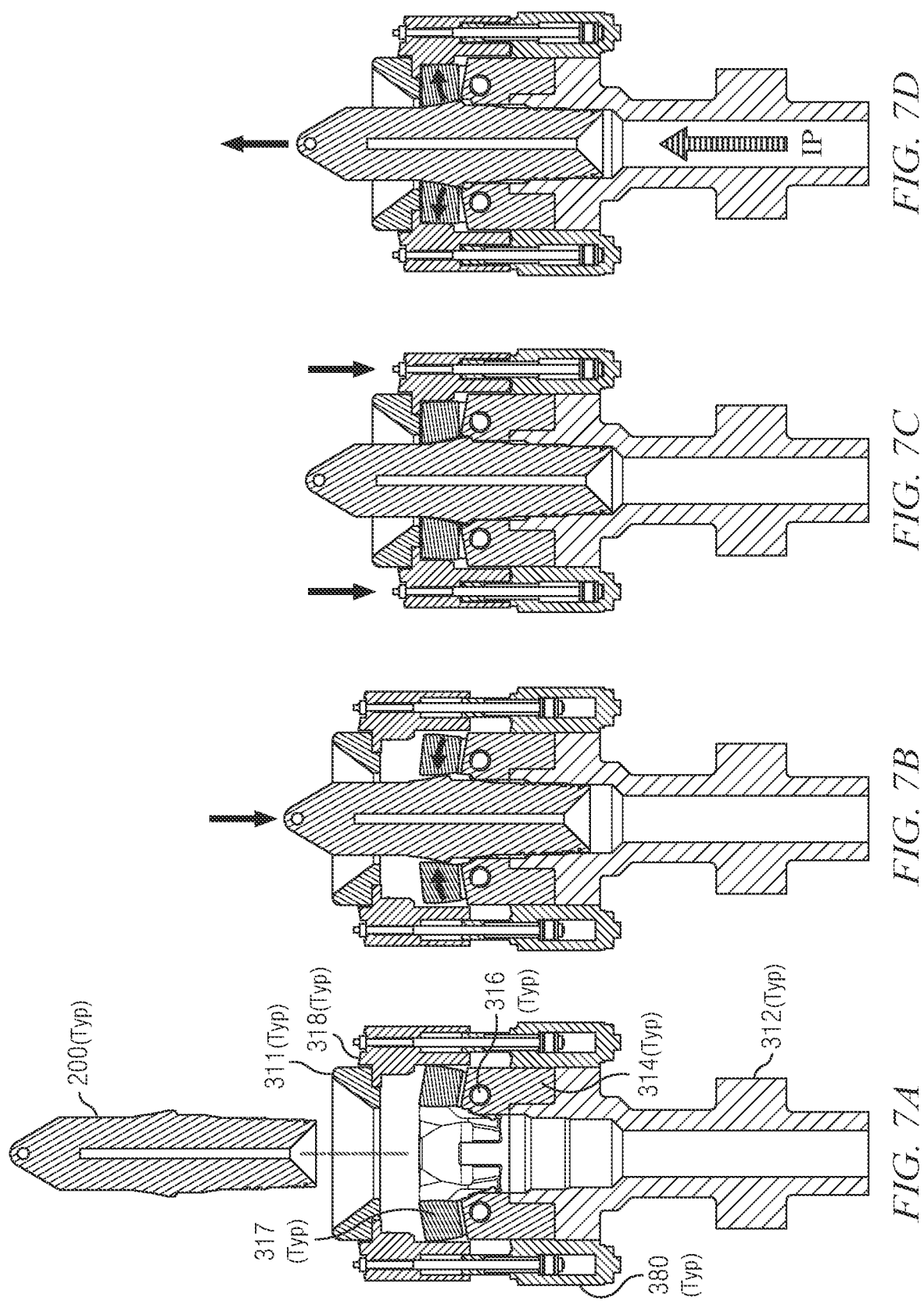

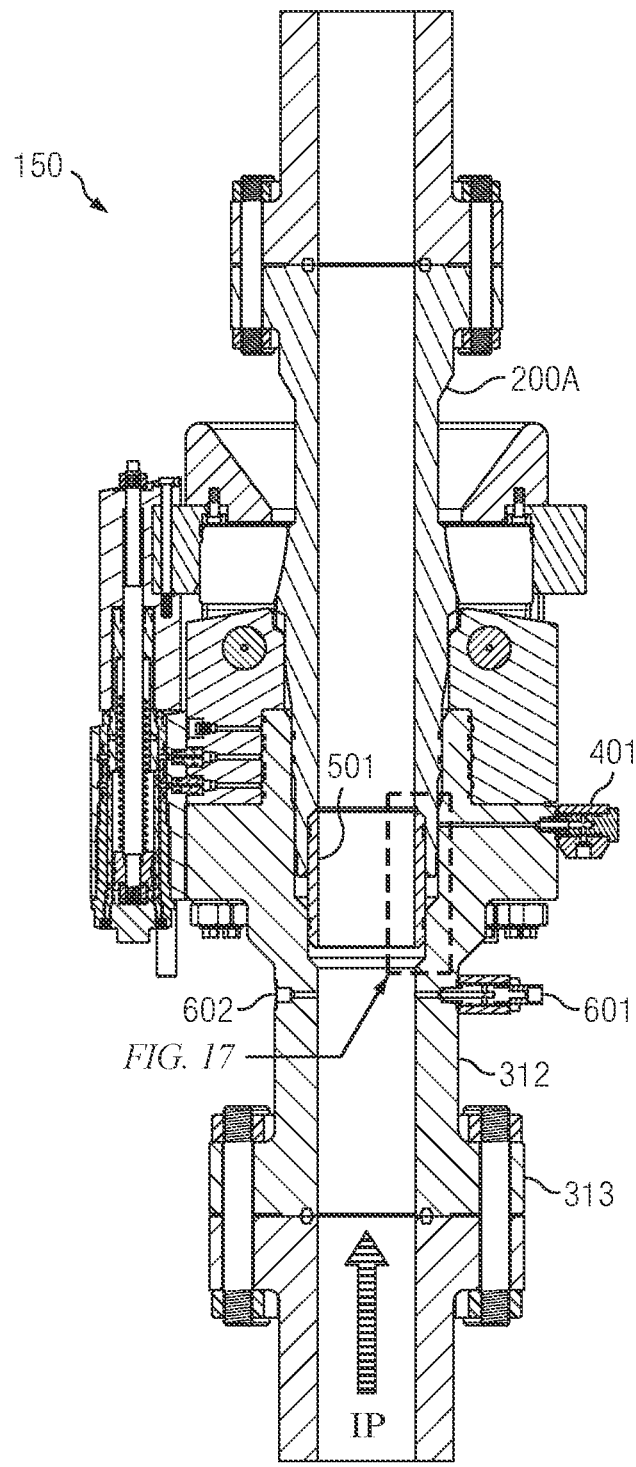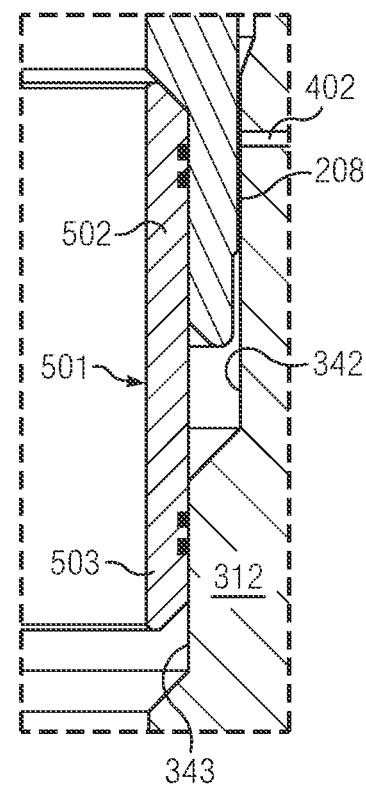
FIG. 16
FIG. 17

PRESSURIZED

LOCKED

SEALED

FREE

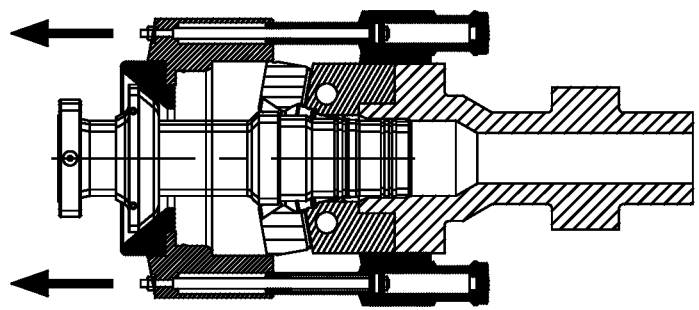
FIG. 21H PROFFERED
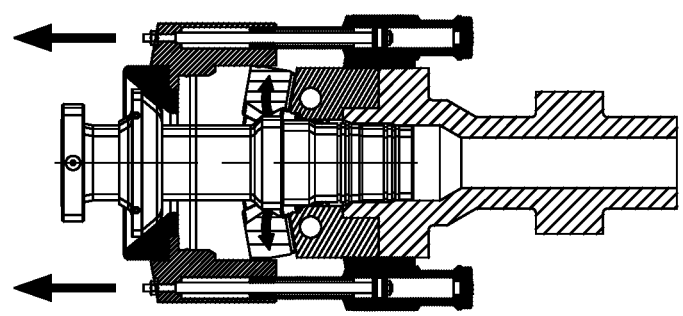
FIG. 21G UNSEALED (RELEASED)
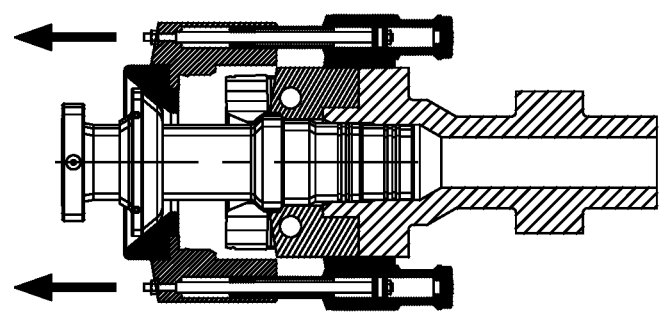
FIG. 21F UNLOCKED BUT STILL SEALED
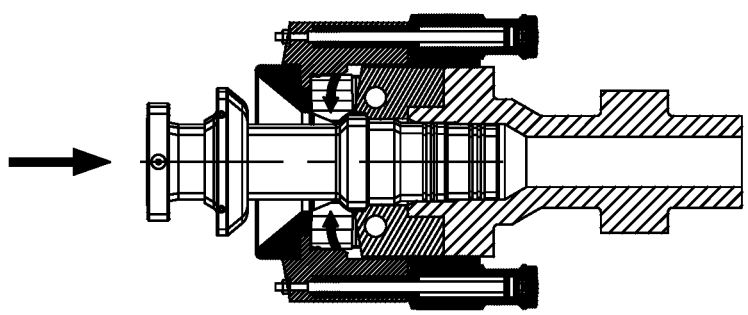
FIG. 21E DEPRESSURIZED

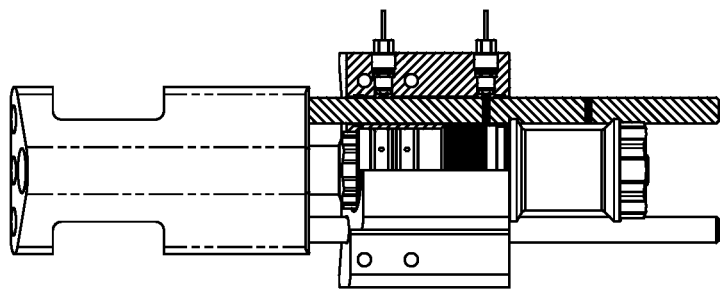

FLUID CONNECTION ASSEMBLY WITH ADAPTER RELEASE

RELATED APPLICATIONS

This application claims priority to, and the benefit of, commonly-invented and commonly-assigned U.S. Provisional Application Ser. No. 63/337,976 filed May 3, 2022. This application is also a continuation-in-part of co-pending, commonly-assigned U.S. nonprovisional patent application Ser. No. 17/127,425 filed Dec. 18, 2020. Ser. No. 17/127,425 is a continuation of commonly-assigned U.S. nonprovisional patent application Ser. No. 16/677,428 filed Nov. 7, 2019 (now U.S. Pat. No. 10,907,435). Ser. No. 16/677,428 is a continuation of commonly-assigned U.S. nonprovisional patent application Ser. No. 16/221,279 filed Dec. 14, 2018 (now U.S. Pat. No. 10,550,659). Ser. No. 16/221,279 claims the benefit of, and priority to, commonly-assigned U.S. provisional patent application Ser. No. 62/649,008 filed Mar. 28, 2018. The entire disclosures of 63/337,976; 17/127,425; 16/677,428; 16/221,279; and 62/649,008 are hereby incorporated herein by reference.

FIELD OF THE DISCLOSURE

This disclosure relates to the field of fluid connections, including without limitation hydraulic fracturing connections and pressure control devices used in subterranean drilling. More specifically, the disclosure relates to such fluid connections having remotely operable locking mechanisms whereby personnel may be moved away from such wells during connection and disconnection of the device. More specifically, this disclosure relates to such fluid connections capable of providing larger diameter seals at higher working pressures.

BACKGROUND

Conventionally, wellhead connections to pressure control equipment are typically made by either a hand union or hammer union. Wellhead operators engaging or disengaging these conventional types of wellhead connections place themselves in danger of injury. The pressure control equipment to be connected to the wellhead is typically heavy, and remains suspended above the wellhead operator via use of a crane. Interacting with the crane operator, a technician at the wellhead below must struggle with the suspended load as it is lowered in order to achieve the proper entry angle into the wellhead to make a secure connection. The wellhead operator must then connect the wellhead to the pressure control equipment, typically via a bolted flanged connection. The bolts must be tightened manually by a person at the wellhead, typically via a "knock wrench" struck with a sledgehammer in order to get the bolts sufficiently tight to withstand the internal operating pressure. During this whole process, as noted, the operator is in physical danger of injuries, such as collision with the suspended pressure control equipment load, or pinched or crushed fingers and hands when securing the connection.

Wellhead operators are exposed to similar risks of injury during conventional removal of the pressure control equipment from the wellhead. The removal process is substantially the reverse of the engagement process described in the previous paragraph.

Existing fluid connections have addressed the foregoing need in the well services industry to connect and disconnect pressure control equipment from the wellhead in a safe environment while minimizing the physical danger to human resources in the vicinity. Applicant's devices such as disclosed in U.S. Pat. Nos. 9,644,443 and 9,670,745 are examples of such existing fluid connections. FIGS. 1A and 1B in this disclosure illustrate examples of such existing fluid connections, and are based upon FIG. 2 in U.S. Pat. Nos. 9,644,443 and 9,670,745.

Embodiments of the fluid connections described in U.S. Pat. Nos. 9,644,443 and 9,670,745 may be rated up to 15,000 psi MAWP (maximum allowable working pressure), with diameters ranging from about 2" to about 7" ID. In practice, however, even though serviceable, embodiments rated over about 10,000 psi MAWP in over about 5" ID have proven difficult to manufacture with consistent performance. Additionally, 10,000 psi MAWP in 5" ID is generally recognized as a satisfactory service rating in wellhead pressure control applications.

Hydraulic fracturing has become an increasingly important technique used in the extraction of hydrocarbons from subterranean formations. Fluid connections are needed in hydraulic fracturing in order, for example, to facilitate flow of fracturing fluid into and out of wells via a wellhead. However, the fracturing process often calls for hydraulic fluid pressures and flow rates exceeding those typically seen in conventional wellhead pressure control applications. In some applications, hydraulic fracturing may call for 15,000 psi MAWP pressures in wellheads up to 8" ID. This in turn translates into a requirement for fluid connections that are rated for such correspondingly higher hydraulic pressures and wellhead diameters. A need exists for a fluid connection design that is capable of consistently retaining higher pressures in larger diameter wellheads, in order to accommodate higher fluid flows at such fluid pressures. At the same time, such a fluid connection design should also be remotely operable in order to address personnel safety considerations near wellheads as described above.

SUMMARY AND TECHNICAL ADVANTAGES

These and other needs in the prior art are addressed by a remotely-operated fluid connection and seal whose designs gain advantage from internal operational working pressure (e.g. ambient well pressure) to tighten the connection and seal against leakage.

According to disclosed and illustrated embodiments, a fluid connection assembly comprises a fluid connection adapter and a fluid connection housing assembly. The fluid connection adapter is received into a fluid connection housing assembly in an "open" position. The fluid connection housing assembly provides a plurality of locking elements rotating about pivot pins. A locking element actuating section on the fluid connection adapter engages locking element rocking faces on the locking elements as the fluid connection assembly enters the fluid connection housing assembly. Engagement of the locking element rocking faces causes the locking elements to rotate, in turn causing locking element inner surfaces to contact a tapered lock engagement surface on the fluid connection adapter. In some embodiments, the fluid connection adapter's entry into the fluid connection housing assembly is stopped as a rib on the fluid connection adapter abuts housing notches within the fluid connection housing assembly. At this point, at least a first seal section on the fluid connection adapter sealingly contacts a first seal bore within the fluid connection housing assembly.

A locking ring is then brought onto the locking elements. A locking ring inner surface contacts locking element outer surfaces. Progressive engagement of the locking ring inner surface on the locking element outer surfaces causes the locking elements to constrict radially about the fluid connection adapter. Constriction of the locking elements urges the locking element inner surfaces to tighten against the tapered lock engagement surface on the fluid connection adapter. At this point, the fluid connection assembly is in the "closed" position.

Internal working pressure may then be introduced into the "closed" fluid connection assembly. For example, such internal working pressure may be from ambient well pressure in pressure and flow communication with the fluid connection assembly. Responsive to such internal pressure, the rib on the fluid connection adapter displaces from abutment with the housing notches on the fluid connection housing assembly, urging the tapered lock engagement surface on the fluid connection adapter even tighter onto the locking element inner surfaces, and urging the locking element outer surfaces even tighter onto the locking ring inner surface. At this point, the fluid connection assembly is in the "closed and locked" position. The presence of internal pressure further urges the first seal section on the fluid connection adapter to expand radially to make tighter contact with the first seal bore (within the fluid connection housing assembly), thereby enhancing the seal formed therebetween.

Alternative disclosed embodiments strengthen the first seal section on the fluid connection adapter with a strengthening sleeve. Additional disclosed embodiments provide a quick test fitting and port to control fluid pressure in between at least the first seal section and the first seal bore.

It is therefore a technical advantage of the disclosed fluid connection assembly to hold higher internal pressures in larger diameters than currently available from existing pressure seals. The disclosed fluid connection designs gain advantage from the internal work pressure to provide improved seal performance.

A further technical advantage of the disclosed fluid connection assembly is that, in currently preferred embodiments, the fluid connection adapter forms its pressure seal with the fluid connection housing assembly "deeper" or "further into" the fluid connection housing assembly than with other known connections. More specifically, the sealing contact between first seal section (on the fluid connection adapter) and first seal bore (on the fluid connection housing assembly) is located further away from the entry point into the fluid connection housing assembly than has typically been seen in other known connections. This "deeper connection" feature enhances the robustness of the seal, and gives the disclosed fluid connection assembly a greater capacity to retain high pressures in high flow/high volume service applications such as hydraulic fracturing. It is known in fracturing operations that the part corresponding to the fluid connection adapter may be exposed to high loads (bending, torsion, compression) as fracturing fluid piping is connected thereto. These loads may be even higher in deployments where coil tubing apparatus, for example, is also planned to be connected to the part corresponding to the fluid connection adapter. Provision of sealing contact "deeper" into the fluid connection housing assembly, as in embodiments of the disclosed fluid connection assembly, mitigates the effect of such high loads to stress or weaken the seal contact.

A further technical advantage of the disclosed fluid connection assembly is that its design favors robustness and dependability. Embodiments of the disclosed fluid connection assembly minimize moving parts and hydraulics in order to enhance robustness at high pressures in larger diameters.

A further technical advantage of the disclosed fluid assembly is that may be remotely operable. According to illustrated embodiments, the locking ring is brought onto the locking elements via retraction of an actuation assembly including a hydraulically-actuated piston. In some deployments, the piston may be actuated remotely. Remote actuation addresses the personnel safety concerns described in the Background section above.

A further technical advantage of the disclosed fluid connection assembly is that, in embodiments in which a strengthening sleeve is provided, the sleeve strengthens and may provide wear protection to seal sections on the fluid connection adapter.

A further technical advantage of the disclosed fluid connection assembly is that, in embodiments in which a quick test fitting is provided, a hand pump can conveniently deliver high pressure fluid to a portion of the pressure connection, especially when such portion is sealed between two sets of sealing rings. Such sealing rings may be o-rings in some embodiments, for example, although throughout this disclosure, the term "sealing ring", wherever used, is not limited to any type of suitable seal that may deployed as a sealing ring. It will be appreciated that the sealing rings may limit or impede high pressure fluid flow into or out of the portion of the pressure connection between the two sets of sealing rings. Embodiments of this disclosure provide a quick test port into the flow-limited portion of the pressure connection between seal sections and seal bores. A hand pump may then be used to deliver fluid to a quick test fitting allowing flow through the quick test port to the flow-limited portion. This allows the pressure integrity of the seals provided by the sealing rings to be tested prior to applying high fluid pressures from an operational pressure source (such as a well). In other applications, the quick test port may be used to equalize pressure in the flow-limited portion of the pressure connection during service engagement and disengagement of the fluid connection assembly.

A further technical advantage of the disclosed fluid connection assembly is that disengagement of the fluid connection adapter from the fluid connection housing assembly is facilitated in embodiments in which an adapter release is provided. Adapter release embodiments are designed to assist with breaking a seal in situations where, during disengagement, the fluid connection adapter and the fluid connection housing assembly remain "stuck together" even though in an unlocked state with internal pressure removed.

In accordance with a first aspect, therefore, this disclosure describes a fluid connection assembly, comprising: a fluid connection adapter having first and second adapter ends, the fluid connection adapter providing a raised lock engagement surface and an adapter release collar on an external surface of the fluid connection adapter, the fluid connection adapter further providing at least a first seal section; a fluid connection housing assembly having first and second housing ends, the fluid connection housing assembly providing a displaceable locking ring, a plurality of locking elements, and at least a first seal bore; wherein each locking element is disposed to constrict radially; wherein each locking element has a locking element outer surface and a locking element inner surface; wherein, during entry of the second adapter end into the first housing end, the first seal section sealingly contacts the first seal bore, wherein the first seal section is disposed to expand radially such that when the first seal section expands radially, the first seal section further tightens sealing contact against the first seal bore; wherein engagement of the locking ring on the locking element outer surfaces causes the locking element inner surfaces to retain the fluid connection adapter via the lock engagement surface; and wherein engagement of the locking ring on the adapter release collar causes the first seal section to release sealing contact with the first seal bore.

According to a second aspect, this disclosure describes a fluid connection assembly, comprising: a fluid connection adapter having first and second adapter ends, the fluid connection adapter providing a raised lock engagement surface and an adapter release collar on an external surface of the fluid connection adapter, the fluid connection adapter further providing at least a first seal section; a fluid connection housing assembly having first and second housing ends, the fluid connection housing assembly providing a displaceable locking ring, a guide funnel, a plurality of locking elements, and at least a first seal bore; wherein the guide funnel is attached to the locking ring; wherein each locking element is disposed to constrict radially; wherein each locking element has a locking element outer surface and a locking element inner surface; wherein, during entry of the second adapter end into the first housing end, the first seal section sealingly contacts the first seal bore, wherein the first seal section is disposed to expand radially such that when the first seal section expands radially, the first seal section further tightens sealing contact against the first seal bore; wherein engagement of the locking ring on the locking element outer surfaces causes the locking element inner surfaces to retain the fluid connection adapter via the lock engagement surface; and wherein engagement of the guide funnel on the adapter release collar causes the first seal section to release sealing contact with the first seal bore.

According to a third aspect, this disclosure describes a fluid connection assembly, comprising: a fluid connection adapter having first and second adapter ends, the fluid connection adapter providing a raised lock engagement surface and an adapter release collar on an external surface of the fluid connection adapter, the fluid connection adapter further providing at least a first seal section; a fluid connection housing assembly having first and second housing ends, the fluid connection housing assembly providing a displaceable locking ring, a plurality of locking elements, and at least a first seal bore; and an actuation assembly, wherein the actuation assembly is configured to extend and retract the locking ring such that sensors on the actuation assembly determine and monitor positional states of the locking ring; wherein each locking element is disposed to constrict radially; wherein each locking element has a locking element outer surface and a locking element inner surface; wherein, during entry of the second adapter end into the first housing end, the first seal section sealingly contacts the first seal bore, wherein the first seal section is disposed to expand radially such that when the first seal section expands radially, the first seal section further tightens sealing contact against the first seal bore; wherein engagement of the locking ring on the locking element outer surfaces causes the locking element inner surfaces to retain the fluid connection adapter via the lock engagement surface; and wherein engagement of the locking ring on the adapter release collar causes the first seal section to release sealing contact with the first seal bore.

In some embodiments according to the first, second or third aspects, each locking element is disposed to constrict radially via rotation about a corresponding pivot pin, and in which the locking elements are disposed to rotate during entry of the second adapter end into the first housing end such that the locking element inner surfaces oppose the lock engagement surface.

Responsive to displacement of the locking ring in some embodiments according to the first, second or third aspects, progressive engagement of a locking ring inner surface on the locking element outer surfaces maintains opposing tapers between the locking element inner surfaces and the lock engagement surface.

In some embodiments according to the first, second or third aspects, the locking element inner surfaces are disposed to tighten against the lock engagement surface responsive to displacement of the second adapter end towards the first housing end during engagement of the locking ring inner surface on the locking element outer surfaces.

In some embodiments according to the first, second or third aspects, the first seal section is disposed to expand radially responsive to introduction of internal pressure within the second adapter end.

In some embodiments according to the first, second or third aspects, the fluid connection housing assembly further provides a quick test port, the quick test port comprising a fluid passageway from a fluid connection housing assembly exterior through to the first seal bore.

In some embodiments according to the first, second or third aspects, the second adapter end further includes a strengthening sleeve.

In some embodiments according to the first, second or third aspects, a spring bias ordains a default rotational position for the locking elements about their corresponding pivot pins.

In some embodiments according to the first, second or third aspects, at least one actuator assembly energizes retraction of the locking ring. In some such embodiments, the at least one actuator assembly is remotely operable.

The foregoing has outlined rather broadly some of the features and technical advantages of the technology embodied in the disclosed fluid connection designs, in order that the detailed description that follows may be better understood. Additional features and advantages of the disclosed technology may be described. It should be appreciated by those skilled in the art that the conception and the specific embodiments disclosed may be readily utilized as a basis for modifying or designing other structures for carrying out the same inventive purposes of the disclosed technology, and that these equivalent constructions do not depart from the spirit and scope of the technology as described and as set forth in the appended claims.

BRIEF DESCRIPTION OF THE DRAWINGS

For a more complete understanding of embodiments described in detail below, and the advantages thereof, reference is now made to the following drawings, in which:

FIGS. 2, 3 and 4 depict exemplary fluid connection adapter embodiments 200, 200A and 200B respectively;

FIGS. 7A through 7D are sequential "freeze frame" views illustrating engagement of fluid connection assembly 100 to form a fluid connection and seal;

FIG. 16 is a section through high strength fluid connection assembly 150, in which high strength fluid connection assembly 150 is a second embodiment thereof in accordance with this disclosure;

FIG. 17 is an enlargement as shown on FIG. 16;

FIGS. 21A through 21H are sequential "freeze frame" views illustrating various positional states during entry, engagement, release and exit of fluid connection adapter 200X into and out from fluid connection housing assembly 300X in an exemplary adapter release embodiment;

FIGS. 25A through 25D are sequential "freeze frame" views illustrating exemplary positional states of actuator assembly 380X during entry, seal and lock of fluid connection adapter 200X with respect to fluid connection housing assembly 300X.

DETAILED DESCRIPTION

Figure 1A:
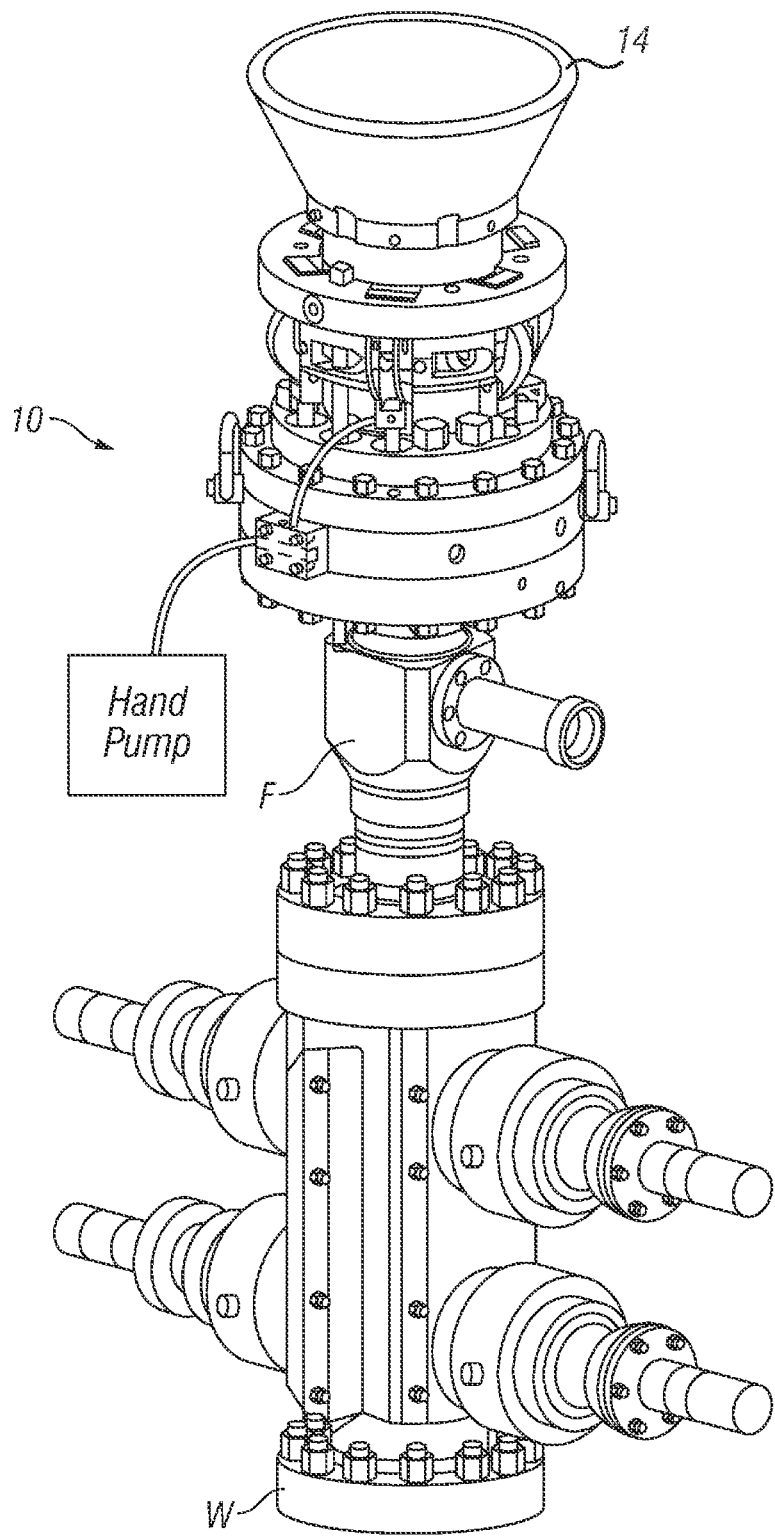
FIGS. 1A and 1B depict a prior art fluid connection.
Figure 1B:
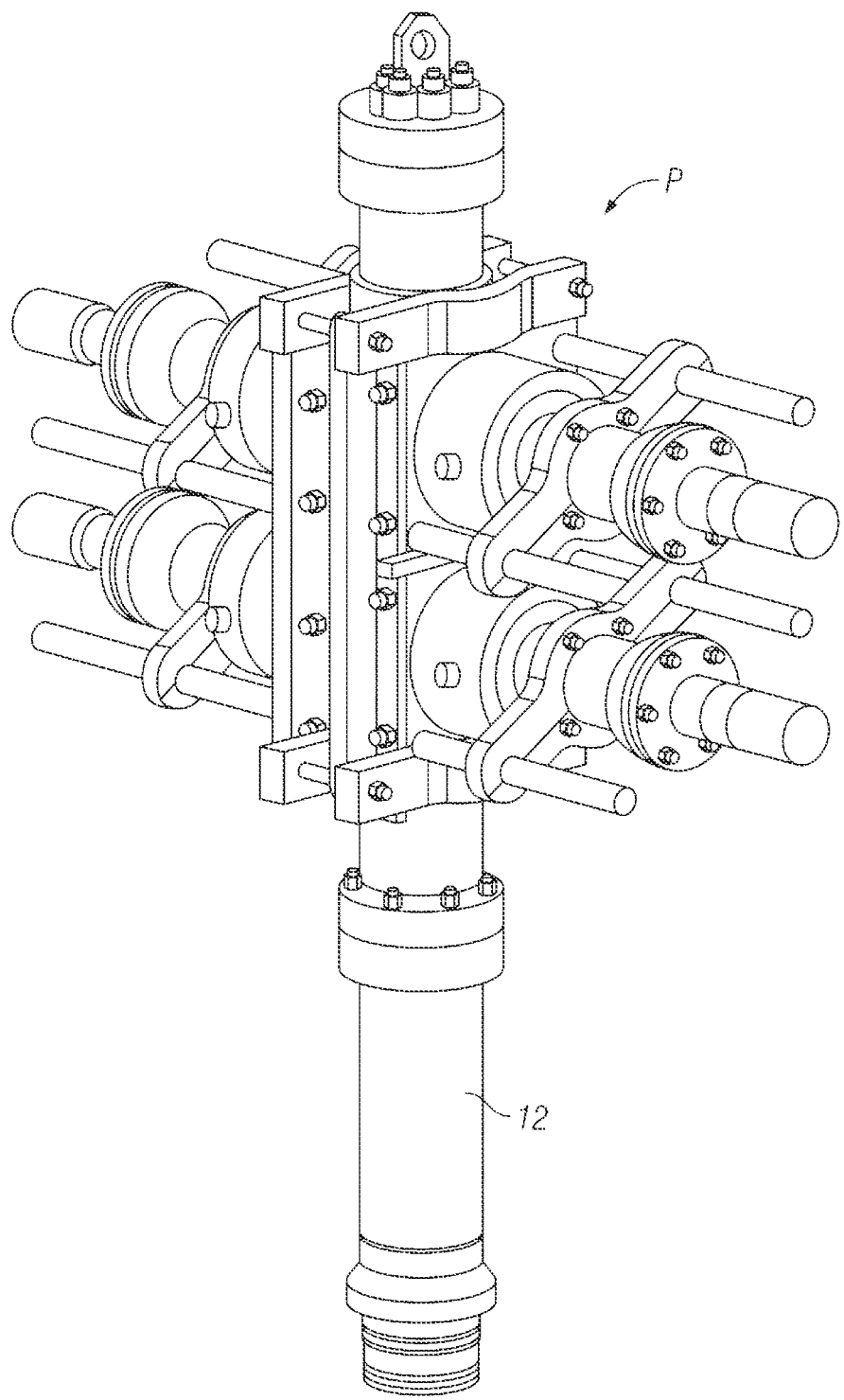

Reference is now made to FIGS. 1A through 25D in describing embodiments of the disclosed fluid connections. For the purposes of the following disclosure, FIGS. 1A and 1B depict prior art devices. FIGS. 2 through 25D depict embodiments of new fluid connection designs. FIGS. 2 through 17 depict embodiments without an adapter release feature, and FIGS. 18 through 25D depict embodiments with an adapter release feature. FIGS. 2 through 17 should be viewed together, and FIGS. 18 through 25D should be viewed together with further reference to FIGS. 2 through 17. Any part, item, or feature that is identified by part number on one of FIGS. 1A through 25D will have the same part number when illustrated on another of FIGS. 1A through 25D. It will be understood that the embodiments as illustrated and described with respect to FIGS. 2 through 25D are exemplary, and the scope of this disclosure is not limited to such illustrated and described embodiments.

FIGS. 1A and 1B illustrate examples of existing fluid connections, and are based upon FIG. 2 in U.S. Pat. Nos. 9,644,443 and 9,670,745. FIGS. 1A and 1B should be viewed together. In FIGS. 1A and 1B, pressure control equipment ("PCE") is labeled generally as P, and wellhead is labeled generally as W. Pressure control assembly 10 is secured to wellhead W via a conventional bolted flange, although not limited in such regard. The wellhead end of pressure control assembly 10 advantageously provides a customized fitting F to connect to wellhead W. Adapter 12 is secured to PCE P via conventional threading, although not limited to a threaded connection between PCE P and adapter 12. In operation, adapter 12 enters pressure control assembly 10 via tulip 14. Adapter 12 and pressure control assembly 10 thereupon combine to form a fluid connection and seal according to the disclosure of U.S. Pat. Nos. 9,644,443 and 9,670,745.

Figure 5:
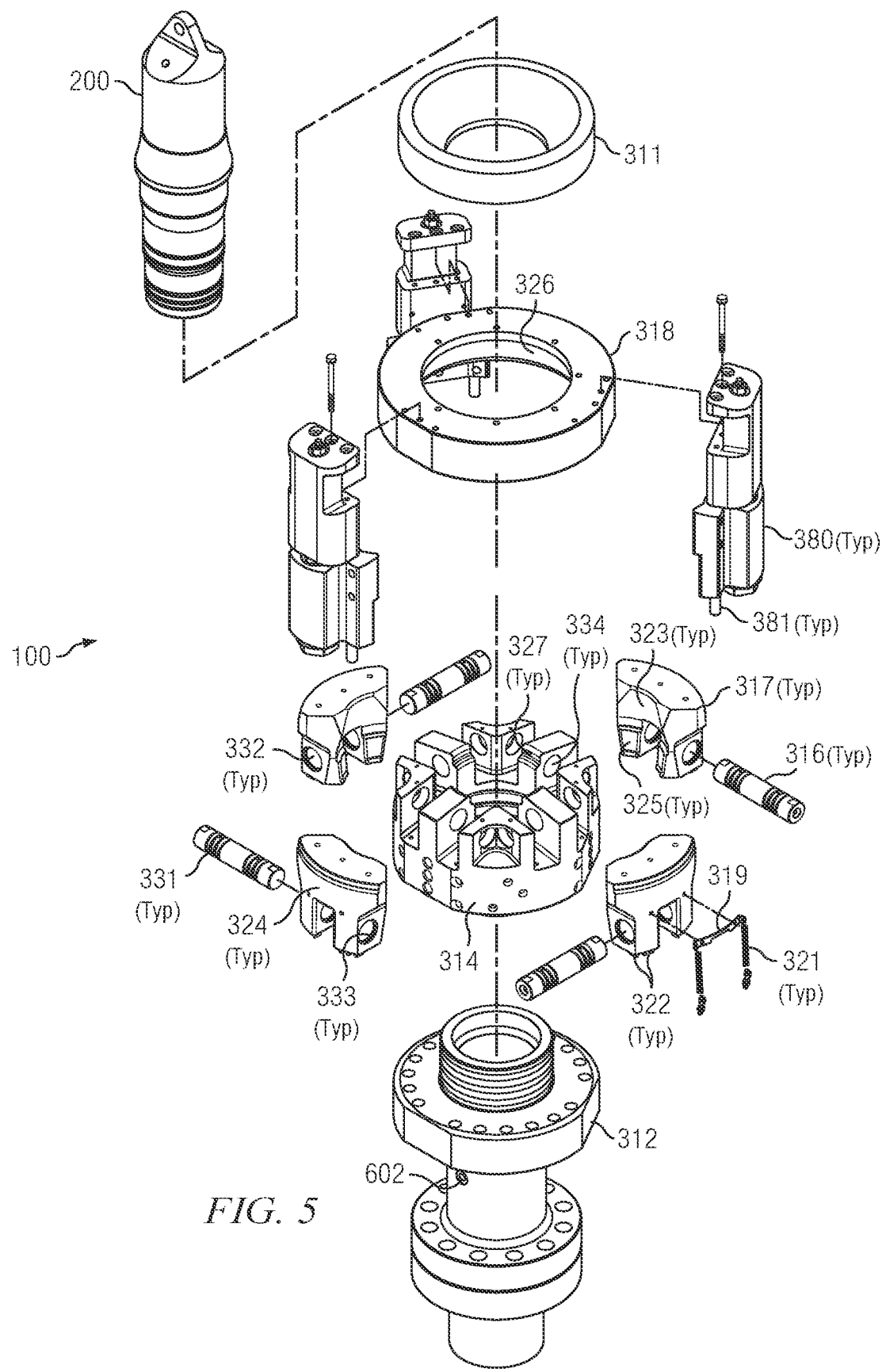
FIG. 5 is an exploded view of fluid connection assembly 100, in which fluid connection assembly 100 is a first embodiment thereof in accordance with this disclosure.
Figure 6:
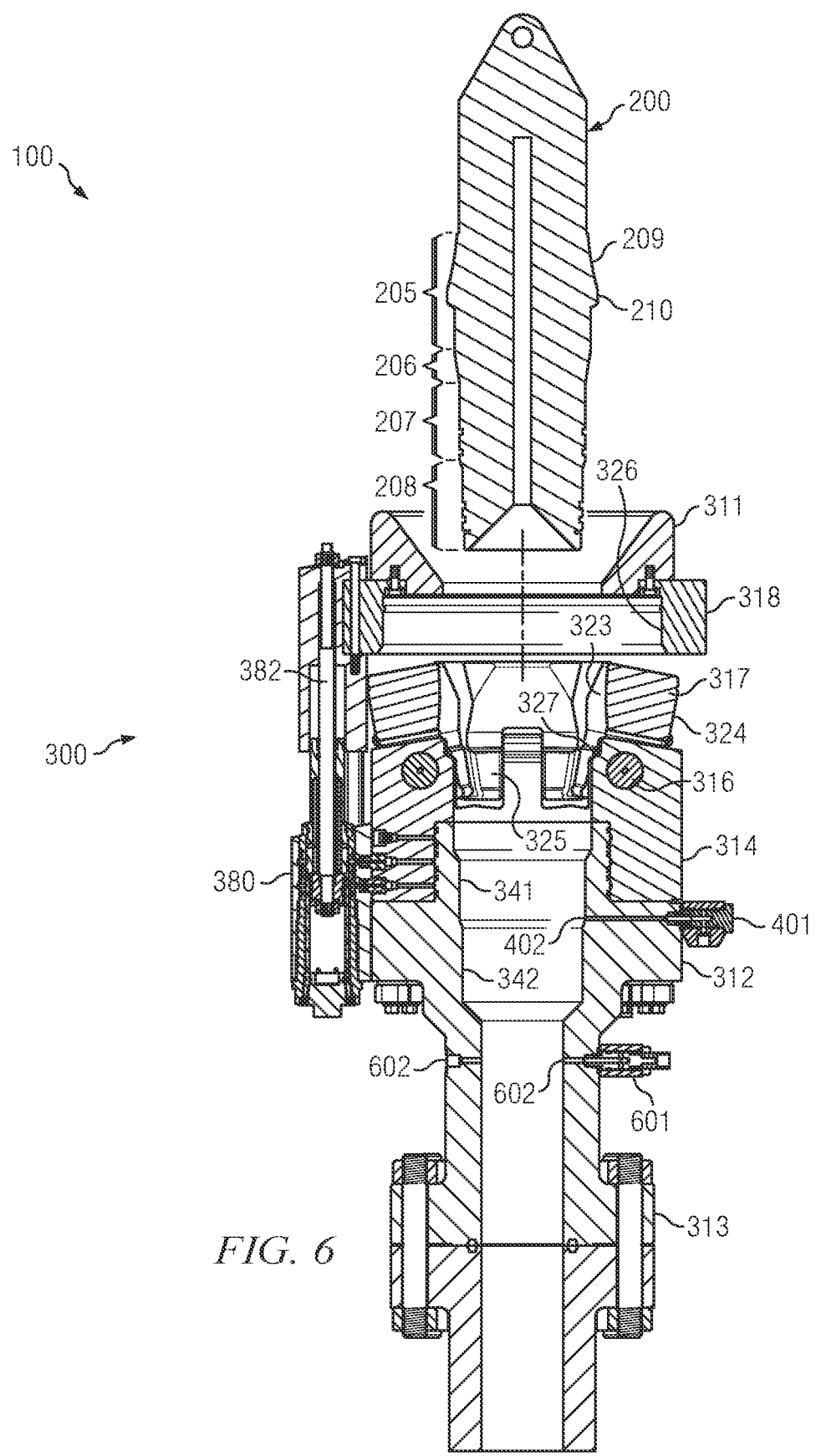
FIG. 6 is a section through fluid connection assembly 100 in an "open" position.

FIGS. 2, 5 and 6 should now be viewed together. FIGS. 2, 5 and 6 illustrate one embodiment of the remotely-operated fluid connection and seal technology described in this disclosure. Referring first to FIG. 6, fluid connection assembly 100 comprises fluid connection adapter 200 and fluid connection housing assembly 300. Fluid connection adapter 200 has first and second adapter ends, in which the first adapter end is blank (or closed off) and the second adapter end is configured to be inserted into fluid connection housing assembly 300. Fluid connection housing assembly 300 has first and second housing ends, in which the first housing end is configured to receive the second adapter end. Fluid connection housing assembly 300 may provide a wellhead adapter 312 with a flanged connection 313 at the second housing end to enable ultimate connection to a pressurized source of fluids (such as, for example, a wellhead). Stated generally with reference to FIG. 6, fluid connection housing assembly 300 provides: (i) a retractable locking ring 318; (ii) a plurality of locking elements 317, and (iii) at least a first seal bore 341.

As noted, the embodiments illustrated on FIGS. 2, 5 and 6 include fluid connection adapter 200 having a blank (or closed off) first adapter end. As such, fluid connection adapter 200 is suitable for use as a nightcap, or when operators wish to close off a wellhead temporarily. Fluid connection adapter is not limited in its deployments.

Figure 4:
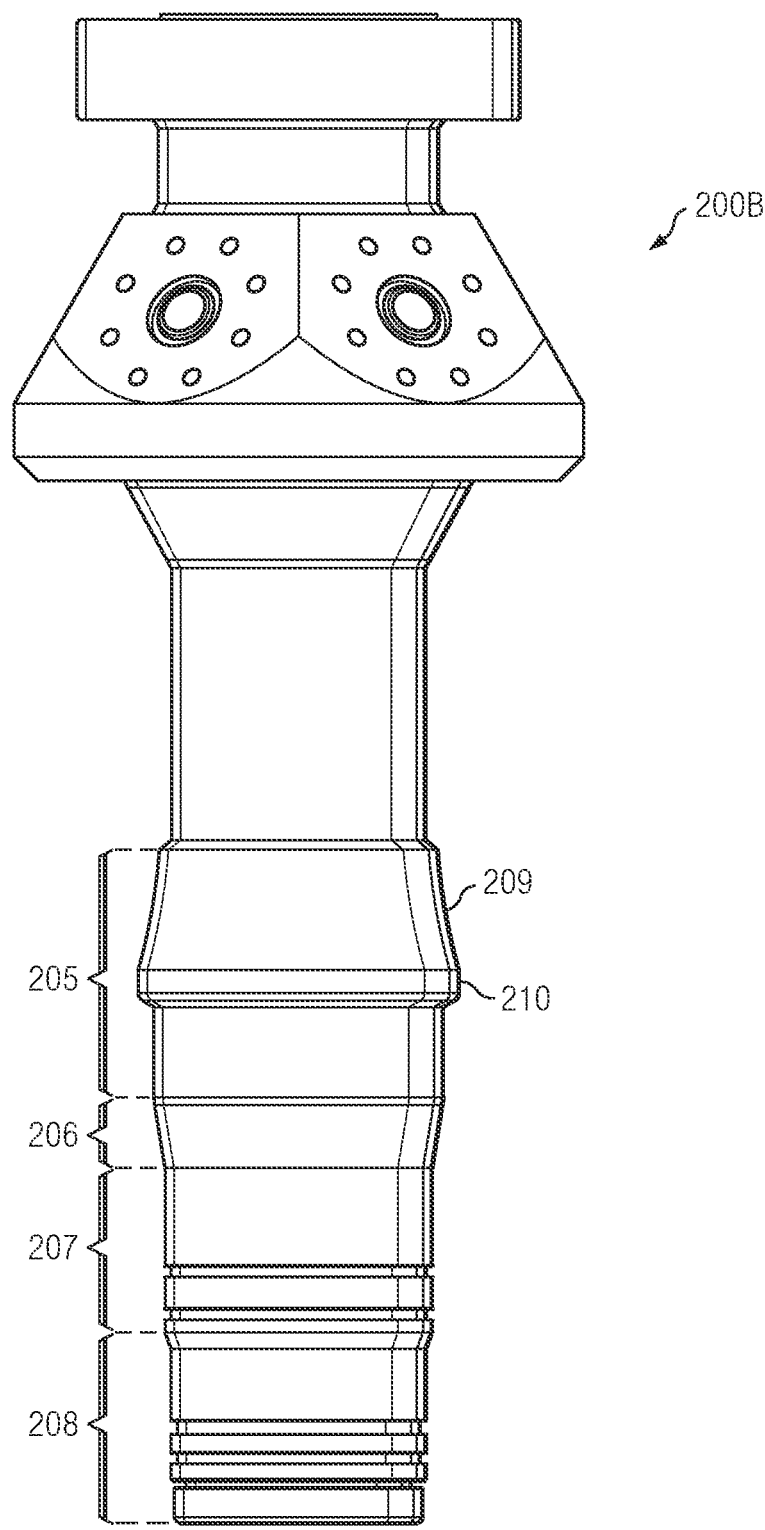

FIGS. 3 and 4 illustrate alternative embodiments to fluid connection adapter 200 on FIGS. 2, 5 and 6. For example, flanged fluid connection adapter 200A on FIG. 3 provides a flange at its first adapter end thereof for further connection to other equipment (such as pressure control equipment in wellhead pressure control applications. By way of further example, goat head fluid connection adapter 200B on FIG. 4 provides a "goat head"-style manifold at its first adapter end thereof for connection to multiple fracturing fluid lines during hydraulic fracturing service. The scope of this disclosure is not limited to the examples of FIGS. 2, 3 and 4.

It will nonetheless be noted from FIGS. 2, 3 and 4 that each of the illustrated alternative adapter embodiments 200, 200A, 200B each share a common configuration at their second adapter ends, to be described in more detail immediately below with reference to FIG. 2. In this way, and with reference now to FIG. 6, such common configuration allows alternative adapter embodiments 200, 200A, 200B to be interchangeable when inserted into fluid connection housing assembly 300.

With reference now to FIG. 2, fluid connection adapter 200 generally provides in order towards the second adapter end: (a) a tapered lock engagement surface 209, (b) a locking element actuating section 206, and (c) at least a first seal section 207. In more detail, fluid connection adapter 200 provides an enlarged outer diameter (OD) section 205. Enlarged OD section 205 includes tapered lock engagement surface 209 and rib 210. As will be described, enlarged OD section 205 acts as a positive stop to enable fluid connection adapter 200 to enter fluid connection housing assembly 300 to only a predetermined longitudinal position.

Fluid connection adapter 200 also provides locking element actuating section 206. Fluid connection adapter 200 further provides first and second seal sections 207, 208. Locking element actuating section 206 and first and second seal sections 207, 208 are described in more detail below with reference to interaction with cooperating parts within fluid connection housing assembly 300. However, it will be seen on FIG. 2 that first and second seal sections 207, 208 also preferably each provide one or more grooves in which sealing rings may be located, in order to further facilitate seals between cooperating machined surfaces. Sealing rings (such as o-rings, for example) have been omitted for clarity in this disclosure.

FIGS. 5 and 6 should now be viewed together. FIG. 5 is an exploded view and FIG. 6 is a section view of the illustrated embodiments of fluid connection assembly 100. FIG. 6 shows fluid connection assembly 100 in an "open" position. Fluid connection adapter 200 is described in detail above with reference to FIG. 2.

Fluid connection housing assembly 300 includes wellhead adapter 312 at a second housing end thereof, per earlier disclosure. Fluid connection housing 314 is connected to wellhead adapter 312 by a flange/bolted connection. In other embodiments (not illustrated), fluid connection housing 314 and wellhead adapter 312 may be integrally formed, or connected by a threaded connection, and the scope of the disclosure is not limited in this regard.

Wellhead adapter 312 provides first and second seal bores 341, 342 formed therein. First and second seal bores 341, 342 are shaped to receive and form seals with first and second seal sections 207, 208 respectively on fluid connection adapter 200. Note first and second seal bores 341, 342 and first and second seal sections 207, 208 may preferably further include sealing rings to enhance sealing. Such sealing rings (such as o-rings, for example) are omitted for clarity on FIGS. 5 and 6.

Fluid connection housing 314 provides housing notches 327. When fluid connection adapter 200 is received into fluid connection housing assembly 300, rib 210 on fluid connection adapter 200 eventually abuts housing notches 327, thereby limiting the travel of fluid connection adapter 200 into fluid connection housing assembly 300.

Figure 9:
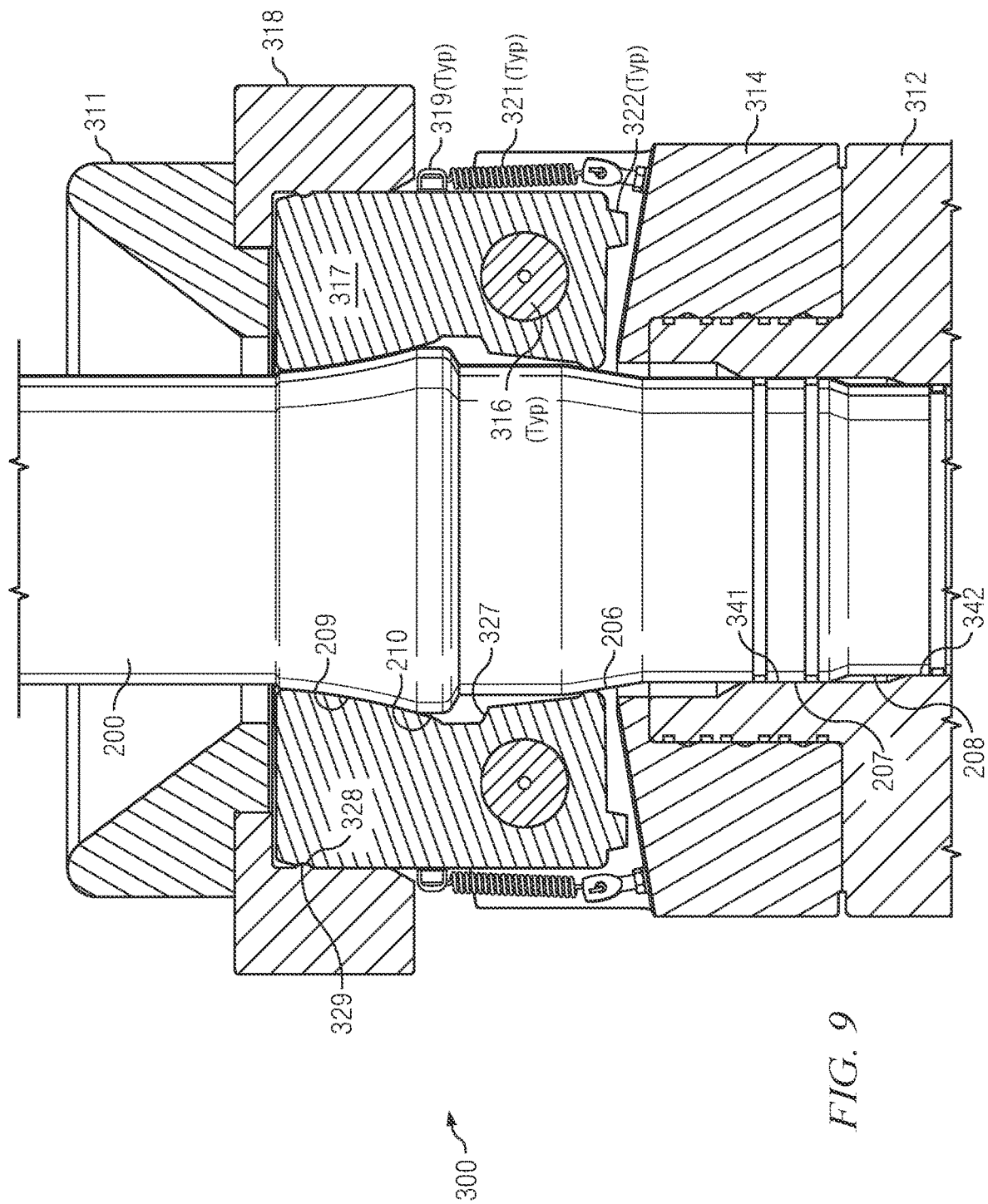
FIG. 9 is a partial section through fluid connection assembly 100 in a "closed and locked" position.

A plurality of locking elements 317 rotate within fluid connection housing 314. In the embodiments illustrated on FIGS. 5 and 6, four (4) locking elements 317 are provided. The scope of this disclosure is not limited to any specific number of locking elements 317 that may be provided in other embodiments. Stated generally, each locking element 317 is disposed to constrict radially via rotation about a corresponding pivot pin 316 provided in the fluid connection housing assembly 300. In more detail, locking elements 317 rotate about pivot pins 316 received into pin bores 332 on locking elements 317 and housing bores 334 on fluid connection housing 314. Pivot pins 316 preferably provide pin grooves 331 for sealing cooperation with pin rotation gaskets 333 deployed within pin bores 332 in locking elements 317. In the embodiments illustrated on FIGS. 5 and 6, rotation stops 322 on locking elements 317 limit rotation of locking elements 317 about pivot pins 316 to a user-selected angular displacement. In other embodiments (not illustrated), rotation stops 322 may not be provided. Locking elements 317 also have straps 319 rigidly affixed (e.g. via bolting) to the exterior thereof in illustrated embodiments. Referring now to FIG. 9, tension springs 321 connect locking elements 317 to fluid connection housing 314 via straps 319. Generally stated, a spring bias ordains a default rotational position for locking elements 317 about their corresponding pivot pins 316. In more detail, tension springs 321 create the spring bias to ordain and hold a default rotational position for locking elements 317 against rotation stops 322 in an "open" position. This disclosure is not limited to the manner in which such a spring bias is created. Other non-illustrated embodiments may, for example, use torsion springs to create the spring bias. Alternatively, other non-illustrated embodiments may, for example, use hydraulic or pneumatic arrangements to create bias to hold locking elements 317 in a default position. Other non-illustrated embodiments may forego holding locking elements 317 in a default position via a spring bias.

FIGS. 5 and 6 illustrate locking elements 317 having locking element inner and outer surfaces 323, 324. Locking elements 317 also have locking element rocking surfaces 325. Locking element rocking surfaces 325, and locking element inner and outer surfaces 323, 324 are all described in more detail below with reference to interaction with cooperating parts within fluid connection housing assembly 300.

Generally stated, at least one actuator assembly 380 energizes retraction of locking ring 318. In some embodiments, actuator assemblies 380 may be remotely operable. In more detail, at least one actuator assembly 380 is rigidly affixed (e.g. via bolting) to fluid connection housing 314. In the embodiments illustrated on FIGS. 5 and 6, three (3) circumferentially spaced-apart actuator assemblies 380 are provided. The scope of this disclosure is not limited to any specific number of actuator assemblies 380 that may be provided in other embodiments. Actuator assemblies 380 are also rigidly affixed (e.g. via bolting) to locking ring 318. In illustrated embodiments, actuator assemblies 380 are hydraulically-actuated piston assembles in which pistons 382 extend and retract locking ring 318 away from and towards locking elements 317. The scope of this disclosure is not limited, however, to any particular design of actuator assemblies 380. Actuator assemblies 380 further preferably provide guide rods 381 running parallel to the travel of pistons 382 to keep such piston travel rigid and straight under operational loads.

Locking ring 318 has locking ring inner surface 326. Locking ring inner surface 326 is described in more detail below with reference to interaction with cooperating parts within fluid connection housing assembly 300. Locking ring 318 is rigidly affixed (e.g. via bolting) to guide funnel 311. Guide funnel 311 assists directing fluid connection adapter 200 into fluid connection housing assembly 300.

FIG. 6 shows wellhead adapter 312 providing quick test fitting 401 received into quick test port 402, preferably by threaded engagement. It will be appreciated that although FIG. 6 illustrates an embodiment in which one quick test fitting and port 401, 402 are provided, the scope of this disclosure is not limited in this regard, and any number quick test ports 402 may be provided (or none at all). However, in most deployments only one will be in operation at any time. Quick test ports 402 that are not in operation may be sealed with threaded plugs for future use. One purpose of providing redundant quick test ports 402 is in case one or more become damaged during service, and have to be permanently sealed. In presently preferred embodiments, quick test ports 402 are preferably 3/16" in diameter, although the scope of this disclosure is not limited in this regard.

Generally stated, fluid connection housing assembly 300 further provides quick test port 402. Quick test port 402 comprises a fluid passageway from the exterior of fluid connection housing assembly 300 through to first seal bore 341, for example. In more detail, quick test fitting 401 and quick test port 402 provide a fluid passageway through wellhead adapter 312 into the space between first and second seal sections 207, 208 and first and second seal bores 341 and 342 when fluid connection adapter 200 is fully received into fluid connection housing assembly 300. Fluid may be introduced through quick test fitting 401 into the space between first and second seal sections 207, 208 and first and second seal bores 341 and 342 (via, for example, hand pumping). Pressure in the space between first and second seal sections 207, 208 and first and second seal bores 341 and 342 may thus be equalized (and in particular, pressure between sealing rings in such space may be equalized) after the introduction of operational high pressure fluid (e.g. from a well) into wellhead adapter 312.

Conversely, it will be appreciated that upon removal of operational pressure within wellhead adapter 312, the seals created between first and second seal sections 207, 208 and first and second seal bores 341 and 342 (and in particular, between sealing rings in such seals) may not immediately release by themselves. Quick test fitting 401 enables fluid trapped at pressure in the space between first and second seal sections 207, 208 and first and second seal bores 341 and 342 to be relieved. In other applications, fluid delivered through quick test fitting 401 enables the integrity of the seals created between first and second seal sections 207, 208 and first and second seal bores 341 and 342 (and in particular, between sealing rings in such seals) to be checked prior to introducing high pressure fluid into a connection between fluid connection adapter 200 and fluid connection housing assembly 300.

FIGS. 5 and 6 also illustrate transducer ports 602. It will be appreciated that although FIG. 6 illustrates an embodiment in which two transducer ports 602 are provided, the scope of this disclosure is not limited in this regard, and any number of transducer ports 602 may be provided (or none at all). It will be understood that various suitable equipment may be deployed into transducer ports 602, including (without limitation) pressure sensors/transducers to monitor internal pressure IP such as shown and described below with reference to FIG. 7D, for example. In illustrated embodiments (such as in FIG. 6, for example), needle valve 601 is deployed in one of transducer ports 602. In such embodiments, needle valve 601 may be used to drain/equalize pressure within wellhead adapter 312 during service operations when, for example, fluid connection adapter 200 is being removed and fluid connection housing assembly 300 is being exposed to atmospheric pressure. The scope of this disclosure is not limited to particular uses for transducer ports 602 or equipment deployed therein.

Figure 8C:
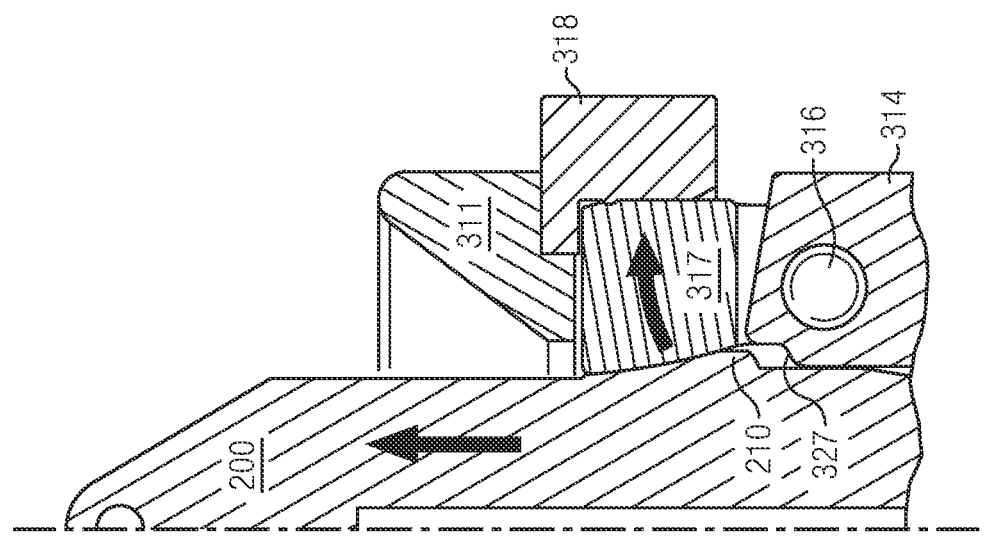
FIGS. 8A, 8B and 8C are additional, enlarged "freeze frame" views further illustrating engagement of fluid connection assembly 100 to form a fluid connection and seal.
Figure 8B:
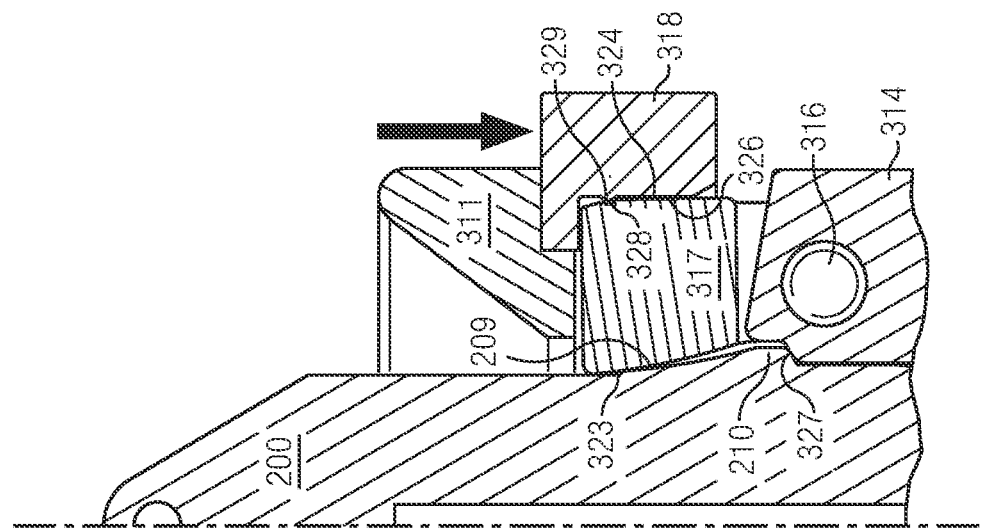
Figure 8A:
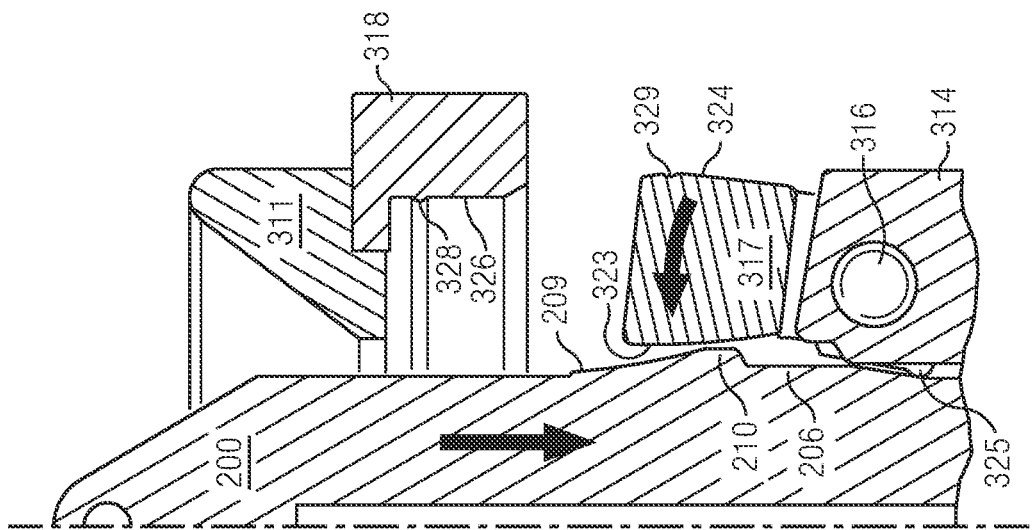

FIGS. 6, 7A through 7D, 8A through 8C, and 9 should now be viewed together for an understanding of the operation of embodiments of the disclosed remotely-operated fluid connection and seal technology. FIGS. 7A through 7D are sequential "freeze frame" views illustrating engagement of fluid connection assembly 100 to form a fluid connection and seal. FIGS. 8A, 8B and 8C are additional, enlarged "freeze frame" views further illustrating engagement of fluid connection assembly 100 to form a fluid connection and seal. FIG. 9 is a partial section through fluid connection assembly 100 in a "closed and locked" position. FIG. 7A is a simplified rendering of FIG. 6 depicting fluid connection assembly in an "open" position. FIG. 7D is a simplified rendering of FIG. 9 depicting fluid connection assembly 100 in a "closed and locked" position.

Referring first to FIG. 7A, the second adapter end of fluid connection adapter 200 enters the first housing end of the fluid connection housing assembly 300 through guide funnel 311 and past locking ring 318. Stated generally with reference to FIGS. 6, 7A and 7B, during entry of the second adapter end into the first housing end: (A) locking element actuating section 206 contacts locking element rocking surfaces 325, thereby causing locking elements 317 to rotate such that locking element inner surfaces 323 contact the tapered lock engagement surface 209; and (B) first seal section 207 sealingly contacts first seal bore 341. Transitioning from FIG. 7A to FIG. 7B in more detail, locking element actuating section 206 on fluid connection adapter makes contact with locking element rocking surfaces 325, causing locking elements 317 to "close" via rotation as shown on FIG. 7B, whereupon locking element inner surfaces 323 begin to engage enlarged OD section 205 on fluid connection adapter 200. FIG. 8A illustrates such "closing" of locking elements 317 in enlarged format. The rotation of locking elements 317 as shown on FIG. 7B also restrains fluid connection adapter 200 from unintended reverse longitudinal movement (i.e. from accidentally "exiting" fluid connection housing assembly 300).

Stated generally with reference to FIGS. 6, 7B and 7C, when locking ring 318 is retracted, progressive engagement of locking ring inner surface 326 on locking element outer surfaces 324 urges locking element inner surfaces 323 to tighten against tapered lock engagement surface 209. Transitioning now from FIG. 7B to FIG. 7C in more detail, fluid connection adapter 200 ends its travel into fluid connection housing assembly 300 as rib 210 abuts housing notches 327. Locking element inner surfaces 323 make full contact with tapered lock engagement surface 209 on fluid connection adapter 200. Actuator assemblies 380 retract to bring locking ring 318 onto locking elements 317. Retraction of actuator assemblies 380 causes locking ring inner surface 326 to make contact with locking element outer surfaces 324. Locking element outer surfaces 324 have a taper. Progressive engagement of locking ring inner surface 326 on locking element outer surfaces 324 causes locking elements 317 to constrict radially. As locking ring inner surface 326 tightens its contact with locking element outer surfaces 324, locking ring 318 urges locking element inner surfaces 323 tighter onto tapered lock engagement surface 209. Preferably, tapered lock engagement surface 209 has a taper selected to cooperate with locking element inner surfaces 323 such that a full tightening action and force translation is enabled as locking elements 317 constrict radially, while still allowing relatively easy disengagement in reverse when releasing fluid connection adapter 200 from fluid connection housing assembly 300. This disclosure is not limited to any specific cooperating tapers selected, and may include curved tapers as well as straight tapers. FIG. 8B illustrates in enlarged format the above-described movement of locking ring 318 onto locking elements 317 to place locking elements 317 into a "closed" position.

Additionally, as illustrated on FIG. 7C, when fluid connection adapter 200 ends its travel into fluid connection housing assembly 300: (1) first seal section 207 on fluid connection adapter 200 sealingly engages first seal bore 341 inside wellhead adapter 312, and (2) second seal section 208 on fluid connection adapter 200 sealingly engages second seal bore 342 also inside wellhead adapter 312.

Stated generally with reference to FIGS. 6, 7C and 7D, the locking element inner surfaces 323 are disposed to further tighten against the tapered lock engagement surface 209 responsive to displacement of the second adapter end towards the first housing end during engagement of the locking ring inner surface 326 on the locking element outer surfaces 324. Transitioning now from FIG. 7C to FIG. 7D in more detail, operational internal pressure IP is introduced inside fluid connection housing assembly 300. Well pressure may be the source of internal pressure IP, for example. Internal pressure IP displaces fluid connection adapter 200 into tighter restraint by locking elements 317. Specifically, responsive to internal pressure IP, rib 210 displaces from abutment with housing notches 327, urging tapered lock engagement surface 209 even tighter onto locking element inner surfaces 323, and urging locking element outer surfaces 324 even tighter onto locking ring inner surface 326.

FIG. 7D also depicts first seal section 207 still sealingly engaged with first seal bore 341, and second seal section 208 still sealingly engaged with second seal bore 342. It will be understood that when internal pressure IP displaces fluid connection adapter 200, first and second seal sections 207, 208 also slidingly displace within first and second seal bores 341, 342 but nonetheless maintain sealing contact and engagement. Further, with additional reference to FIG. 9, it will be understood that, generally stated, first seal section 207 is disposed to expand radially and further tighten sealing contact against first seal bore 341 responsive to introduction of internal pressure IP within the second adapter end. In more detail, the presence of internal pressure IP urges first and second seal sections 207, 208 to expand radially to make tighter contact with first and second seal bores 341, 342, thereby enhancing the seals formed therebetween. FIG. 8C illustrates in enlarged format the displacement of fluid connection adapter 200 into tighter restraint by locking elements 317 wherein locking elements 317 are now in a "closed and locked" position.

Disengagement of fluid connection adapter 200 from fluid connection housing assembly 300 is essentially the reverse operation of the one described immediately above with reference to FIGS. 7A through 7D. Internal pressure IP is removed. Actuator assemblies 380 extend, causing locking ring 318 to release locking elements 317 from radial constriction. Fluid connection adapter 200 may be removed. As enlarged OD section 205 on fluid connection adapter 200 withdraws, tapered lock engagement surface 209 and rib 210 cause locking elements 317 to rotate about pivot pins 316 back into an "open" position.

FIG. 9 is similar to FIGS. 7D and 8C, in that FIG. 9 also illustrates locking elements 317 in a "closed and locked" position. In FIG. 9, however, the illustrated embodiment depicts additional features, some of which may be considered optional in other embodiments. As described above with reference to FIGS. 5 and 6, FIG. 9 shows rotation stops 322 on locking elements 317 to limit rotation of locking elements 317 about pivot pins 316 to a user-selected angular displacement. As also described above with reference to FIGS. 5 and 6, FIG. 9 shows straps 319 and tension springs 321. Tension springs 321 create a spring bias to ordain and hold a default rotational position for locking elements 317 against rotation stops 322 in an "open" position.

FIG. 9 further illustrates locking ring ridge 328 on locking ring 318 matched with locking element groove 329 on locking elements 317. Locking ring ridge 318 is preferably a geometrically inverted ridge shaped to fit within locking element groove 329. Locking ring ridge 328 cooperates with locking element groove 329 to provide an additional locking feature, strengthening the contact between locking ring inner surface 326 and locking element outer surfaces 324 against sliding displacement. Further, the additional locking feature provided by locking ring ridge 328 and locking element groove 329 may prevent inadvertent movement of locking ring 318 during operational service. Such inadvertent movement might arise by erroneous actuation of an actuator assembly 380 during operational service while the disclosed fluid connection is in the "closed and locked" position. The additional locking feature, although optional, may thereby enhance operational safety of the disclosed fluid connection when operational pressure is introduced.

Figure 10:
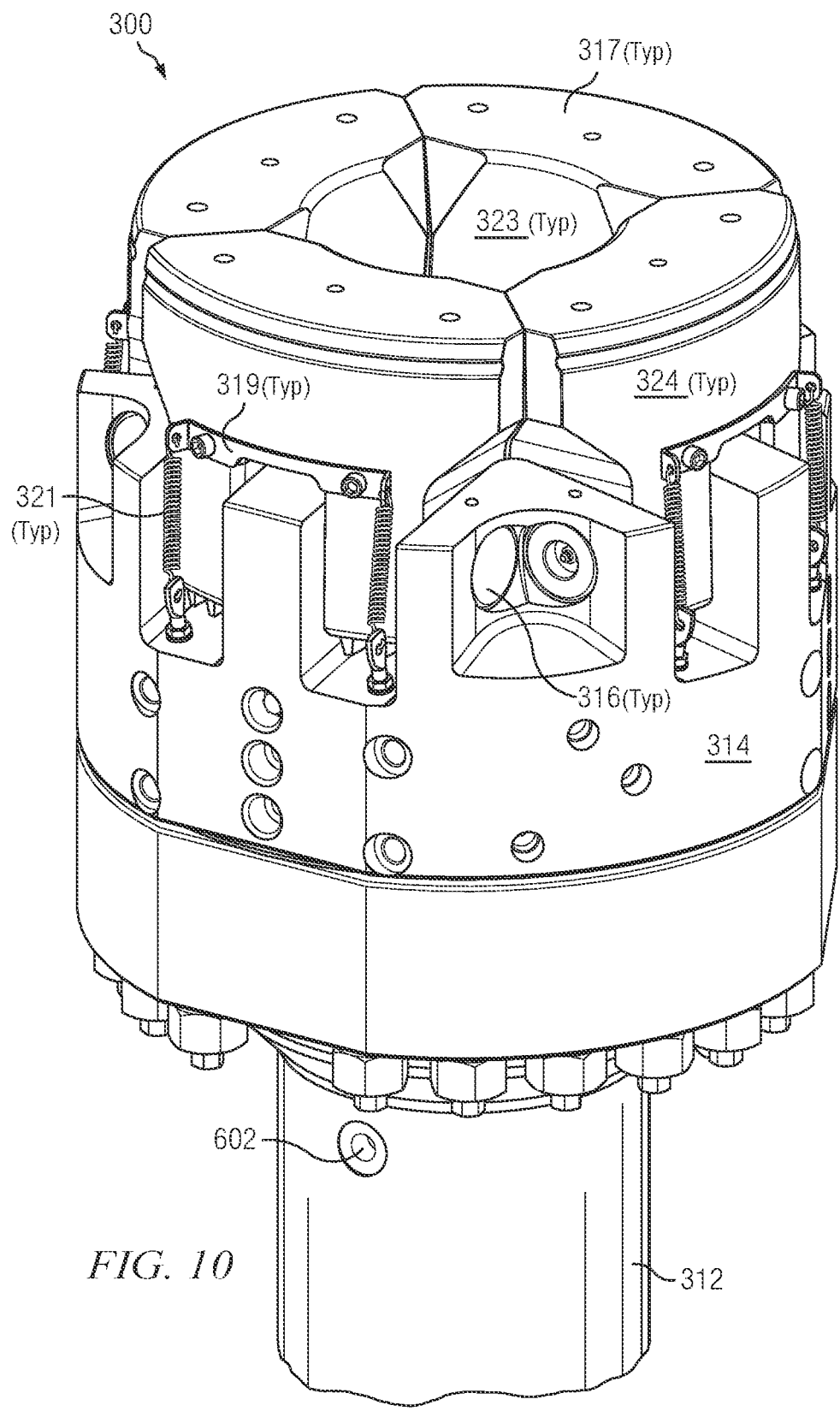
FIG. 10 is a general perspective view of fluid connection housing 300 in isolation, with actuator assemblies 380 and locking ring 318 removed to reveal locking elements 317.

FIG. 10 is a general perspective view of fluid connection housing 300, with actuator assemblies 380 and locking ring 318 removed to reveal locking elements 317. FIG. 10 also illustrates other features described above with reference to other Figures in this disclosure.

Figure 11:
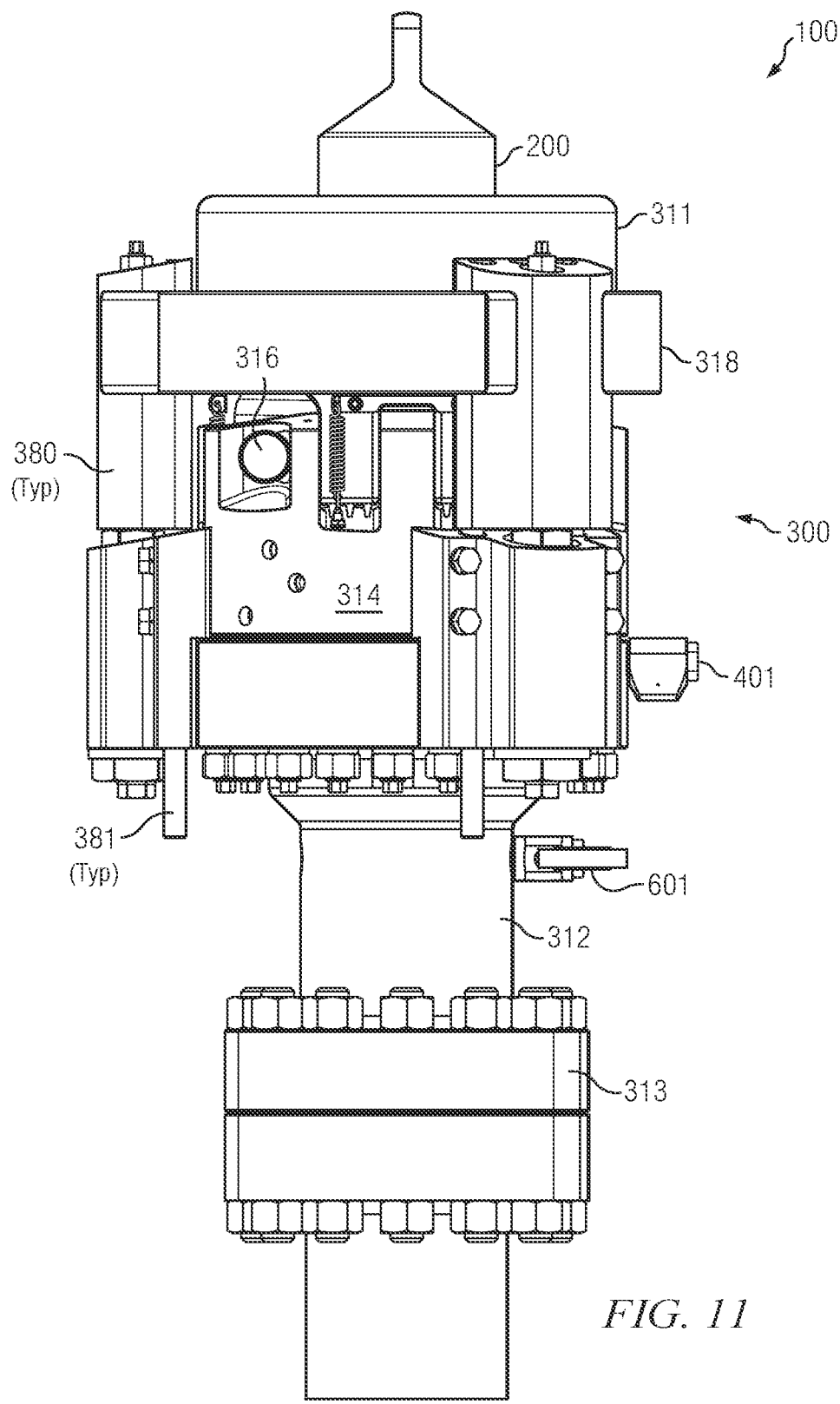
FIG. 11 is a general elevation view of fluid connection assembly 100.
Figure 12:
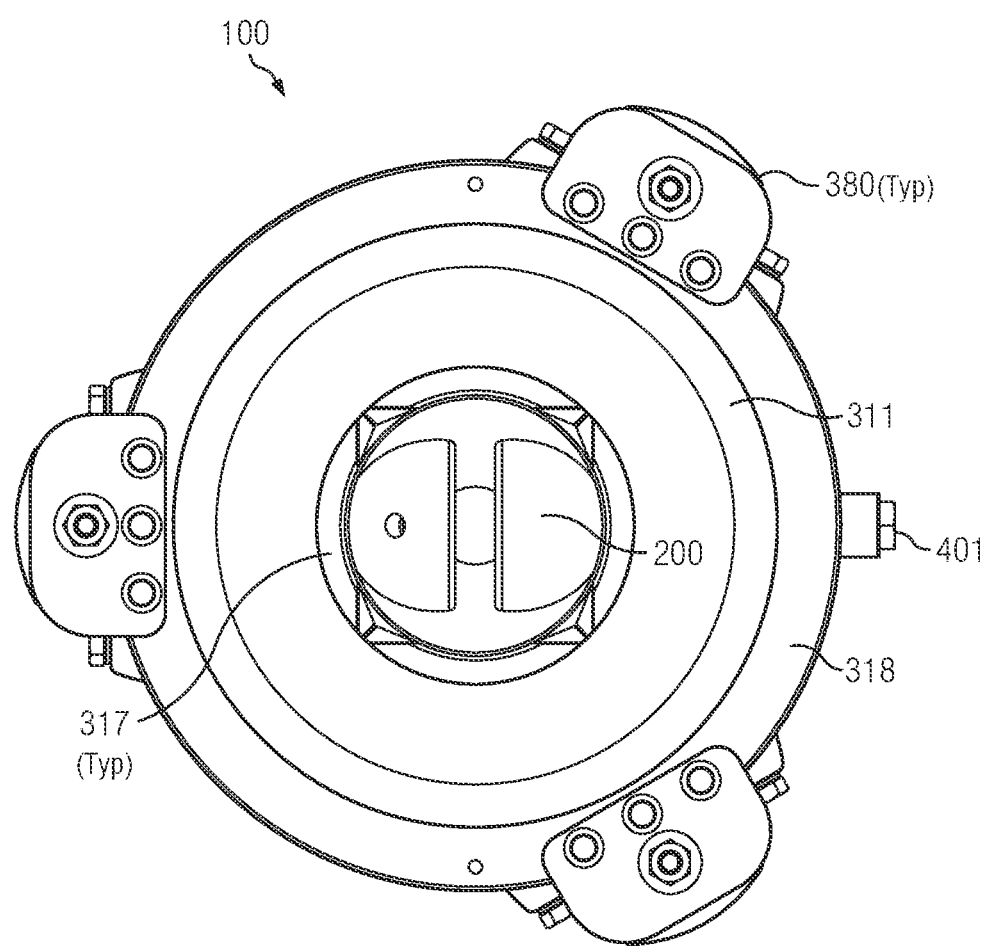
FIG. 12 is a general plan (or "top") view of fluid connection assembly 100.
Figure 13:
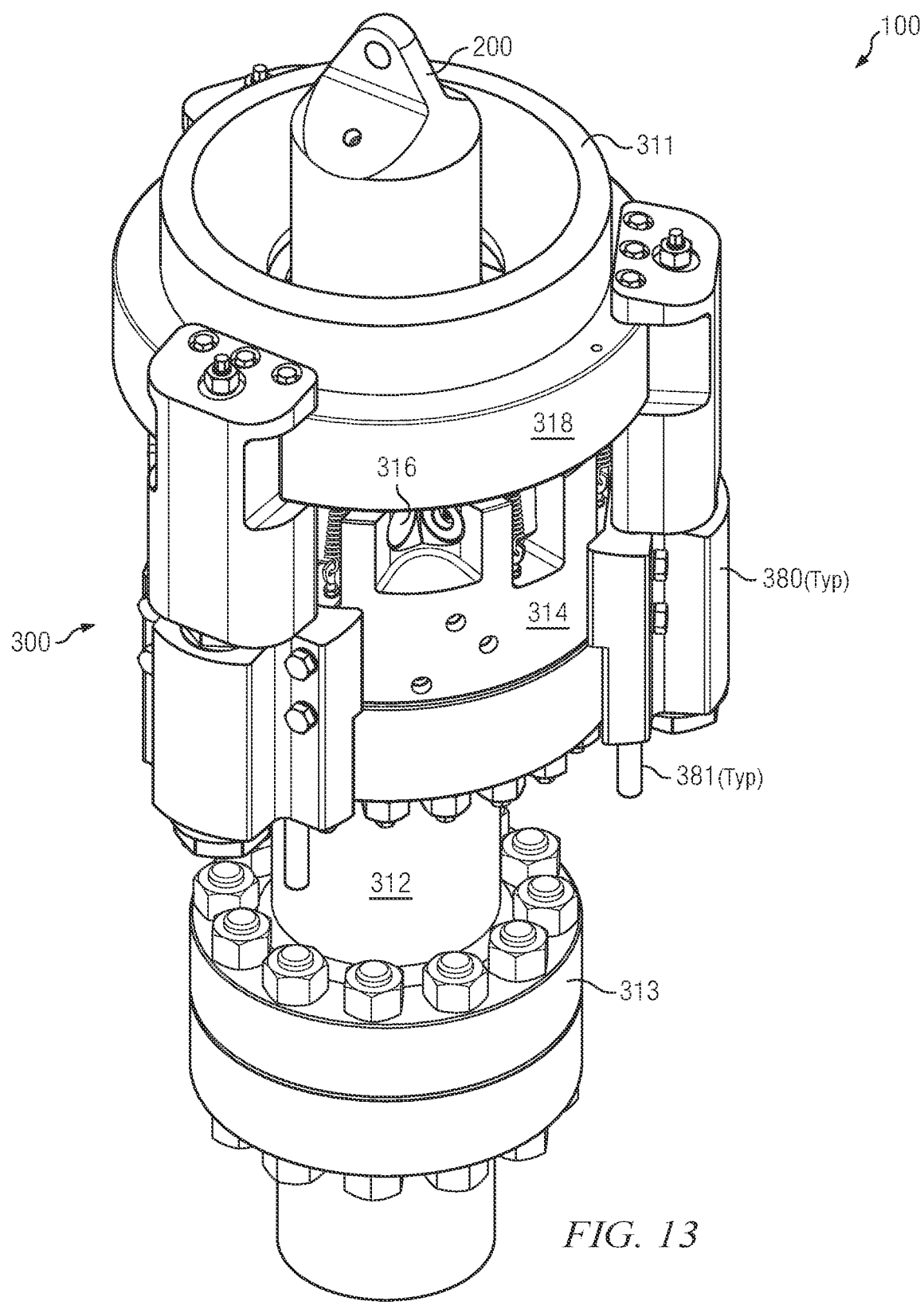
FIG. 13 is a general perspective view of fluid connection assembly 100.

FIGS. 11 through 13 show various views of fluid connection assembly 100. FIG. 11 is a general elevation view of fluid connection assembly 100. FIG. 12 is a general plan (or "top") view of fluid connection assembly 100. FIG. 13 is a general perspective view of fluid connection assembly 100. FIGS. 11 through 13 illustrate features and aspects of fluid connection assembly 100 also described above with reference to other Figures in this disclosure. FIGS. 11 through 13 are intended to aid further understanding of such features and aspects by providing additional views.

Figures 14, 15:
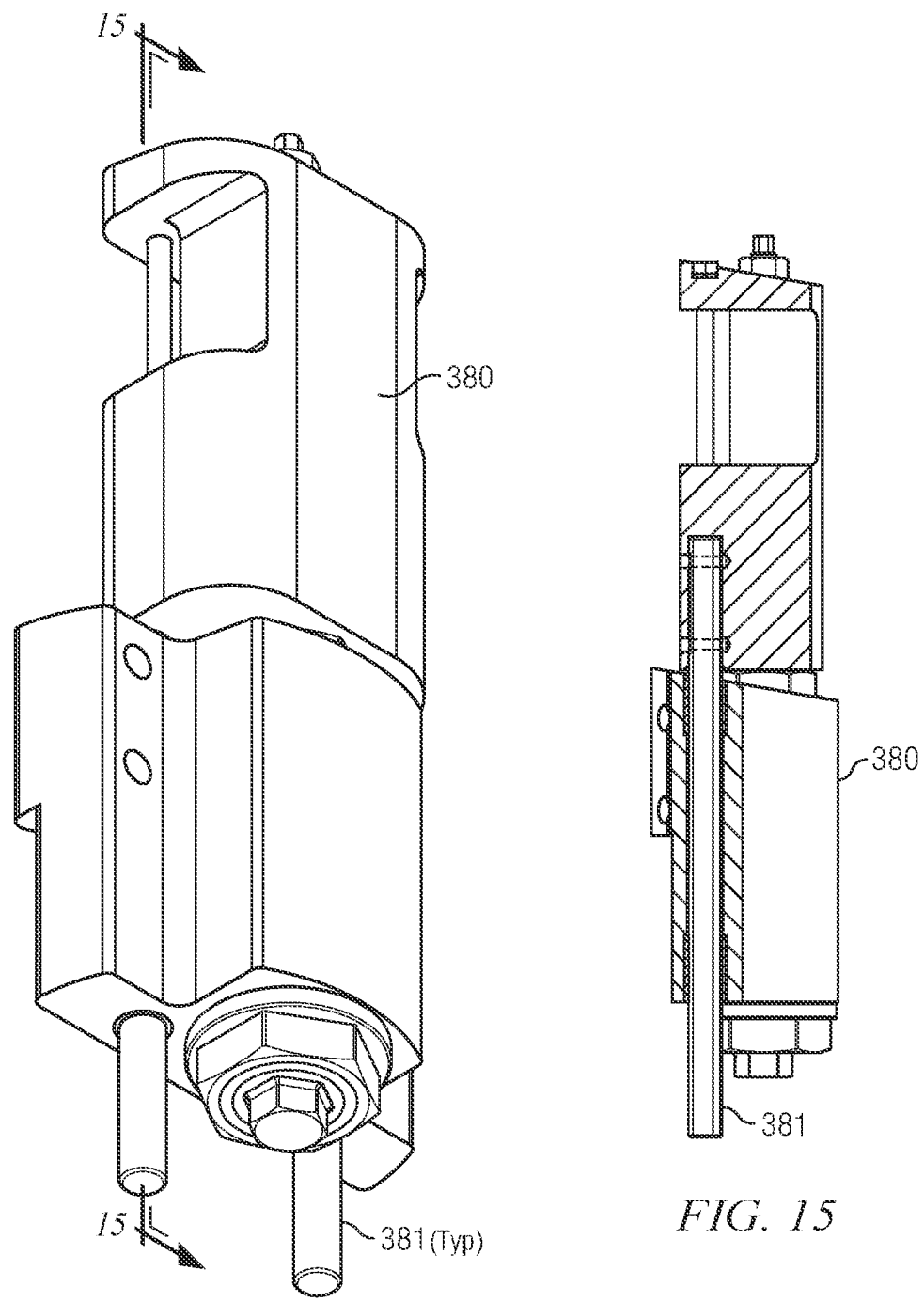
FIG. 14 illustrates one embodiment of an actuator assembly 380 in isolation.
FIG. 15 is a section as shown on FIG. 14.

FIG. 14 illustrates one embodiment of an actuator assembly 380 in a fully retracted position, and FIG. 15 is a section as shown on FIG. 14. As noted in the description above with reference to FIGS. 5 and 6, actuator assemblies 380 may be hydraulically-actuated piston assembles in which pistons 382 extend and retract. Pistons 382 are hidden on FIGS. 14 and 15 in order to better view guide rods 381. As shown on FIGS. 14 and 15, guide rods 381 preferably run parallel to the travel of pistons 382 to keep such piston travel rigid and straight under operational loads. In illustrated embodiments, two (2) guide rods 381 are provided for each actuator assembly 380, although the scope of this disclosure is not limited in this regard.

FIG. 16 is a section view through high strength fluid connection assembly 150. FIG. 17 is an enlargement as shown on FIG. 16. High strength fluid connection assembly 150 presents additional embodiments. In contrast to previously-described embodiments, FIGS. 16 and 17 depict high strength fluid connection assembly 150 providing strengthening sleeve 501.

It will be noted that the illustrated embodiments of FIG. 16 also include depiction of flanged fluid connection adapter 200A from FIG. 3. It will nonetheless be understood that the following description of strengthening sleeve 501 is independent of the style of fluid connection adapter deployed. Strengthening sleeve 501 may be provided on any style of fluid connection adapter (including as depicted on FIGS. 2, 3 and 4) and the scope of this disclosure is not limited in this regard.

Generally stated, and as shown on FIGS. 16 and 17, the second adapter end further includes strengthening sleeve 501, wherein strengthening sleeve 501 provides wall thickness strengthening to a selected portion of the second adapter end. In more detail, strengthening sleeve 501 strengthens the material on flanged fluid connection adapter 200A in the region of second seal section 208, and further provides a strengthening sleeve extended portion 503 on the second adapter end that sealingly engages with strengthening sleeve bore 343 provided in wellhead adapter 312. Advantageously, strengthening sleeve 501 is made from a strengthening metal such as titanium, although the scope of this disclosure is not limited to any particular material selection for strengthening sleeve 501. FIG. 17 shows that the presence of strengthening sleeve 501 is operative to reduce the effective internal diameter at which a seal is formed to coincide with strengthening sleeve bore 343, either via direct contact between strengthening sleeve 501 and strengthening sleeve bore 343, or via contact between strengthening sleeve 501 and second seal section 208.

It will be understood that in some embodiments, flanged fluid connection adapter 200A has a wall thickness that is thinnest at the second adapter end, in the region of second seal section 208. This thinning of wall thickness is inevitable given a geometry that requires (1) keeping external diameter towards the second adapter end small (to pass through locking elements 317 in the "open" position), and (2) keeping internal diameter large throughout so as not to affect internal flow or pressure. Especially at higher working pressures, it will be appreciated that when internal pressure IP on FIG. 16 urges second seal section 208 to expand radially onto second seal bore 342, the thinner wall thickness of flanged fluid connection adapter 200A in the regions of second seal section 208 may be susceptible to deformation or cracking, possibly leading to failure.

In other embodiments, such as illustrated on FIGS. 16 and 17, strengthening sleeve 501 may be operative to act as a substitute "effective internal wall" of the second adapter end at the location where a pressure seal is formed. In this way, the internal diameter at which the seal is formed may be reduced (the seal now being formed on the exterior of the sleeve). The overall circumferential wall cross-sectional area at such reduced internal diameter is now also reduced (by virtue of a reduced diameter), thereby reducing the force exerted by internal pressure IP on the internal wall. Since the wall material itself in the sleeve is preferably strengthening material, such as titanium, the wall thickness of strengthening sleeve 501 may be thin to retain the force exerted by internal pressure IP.

Thus, as shown on FIGS. 16 and 17, strengthening sleeve 501 is provided as an insert on the second adapter end of flanged fluid connection adapter 200A. In the illustrated embodiments, strengthening sleeve 501 strengthens second seal section 208 by providing strengthening sleeve insert portion 502 received into second seal section 208. In illustrated embodiments (to which the scope of this disclosure is not limited), strengthening sleeve 501 further provides strengthening sleeve extended portion 503 protruding from the second adapter end. As shown on FIG. 17, strengthening sleeve extended portion 503 sealingly engages directly with strengthening sleeve bore 343 provided within wellhead adapter 312.

It will be appreciated that the foregoing description of illustrated embodiments of strengthening sleeve 501 are exemplary only. The scope of this disclosure contemplates embodiments in which a strengthening insert or sleeve may be deployed as required to provide wall thickness strengthening to a selected portion of the second adapter end.

Further, in addition to providing strengthening, some embodiments of strengthening sleeve 501 may also provide wear protection to the inside of second adapter end via wear coatings such as, for example, tungsten carbide coatings.

Adapter release embodiments will now be described. While the fluid connection assembly 100 described above with reference to FIGS. 1 through 15 is highly serviceable, some applications have suggested room for additional innovation to assist with actively releasing fluid connection adapter 200 from fluid connection housing assembly 300, especially after depressurization of internal pressure IP. Theoretically, fluid connection adapter 200 may be lifted clear of fluid connection housing assembly 300 once internal pressure IP is removed and fluid connection assembly 100 is moved to an "unlocked" state. However, in some applications, fluid connection adapter 200 and fluid connection housing assembly 300 can still remain "stuck together" until the seal between first and second seal sections 207, 208 and first and second seal bores 341, 342 is broken. In such situations, additional operations may be required to assist breaking the seal, such as pressurizing through quick test fitting 401, applying an external lift force on fluid connection adapter 200, "wiggling" adapter 200 while lifting, etc.

FIGS. 18 through 23 illustrate fluid connection assembly embodiments with an adapter release. Adapter release embodiments are designed to assist with breaking a seal between first and second seal sections 207, 208 and first and second seal bores 341, 342 in situations where fluid connection adapter 200 and fluid connection housing assembly 300 remain "stuck together" even though in an unlocked state with internal pressure IP removed. In adapter release embodiments according to FIGS. 18 through 23, guide funnel 311X is configured to contact a release collar 211 provided on fluid connection adapter 200X when the locking ring 318X is actuated to move away from the fluid connection housing 314. Contact by guide funnel 311X on release collar 211, followed by further displacement of locking ring 318X away from fluid connection housing 314, causes fluid connection adapter 200X to separate from fluid connection housing assembly 300X, thereby breaking a pressure seal between adapter seal sections 207, 208 and housing seal bores 341, 342. In some embodiments, further displacement of locking ring 318X also proffers fluid connection adapter 200X to a crane, for example, which can then withdraw adapter 200X from fluid connection housing assembly 300X.

FIGS. 24A through 25D illustrate an embodiment of actuator assembly 380X including position sensors. It will be appreciated from FIG. 19, for example, that actuator assembly 380X causes guide funnel 311X and locking ring 318X to displace relative to fluid connection housing 314. First and second sensors 384A, 384B on FIGS. 24A through 25D detect positional states of actuator assembly 380X. The detected positional states correspond to selected positions of fluid connection adapter 200X relative to fluid connection housing assembly 300X during entry, lock, seal, release and exit of fluid connection adapter 200X into and out from fluid connection housing assembly 300X. In embodiments illustrated on FIGS. 24A through 25D, first and second sensors 384A, 384B detect proximity to first and second sensed portions 387A, 387B of guide rods 311X. First and second sensed portions 387A, 387B are located on guide rods 311X such that detected proximity to either, neither or both of first and second sensors 384A, 384B corresponds to a positional state of fluid connection adapter 200X during travel into and out from fluid connection housing assembly 300X. The positional states of fluid connection adapter 200X detected by sensors 384A, 384B relative to fluid connection housing assembly 300X may be monitored remotely.

Figure 18:
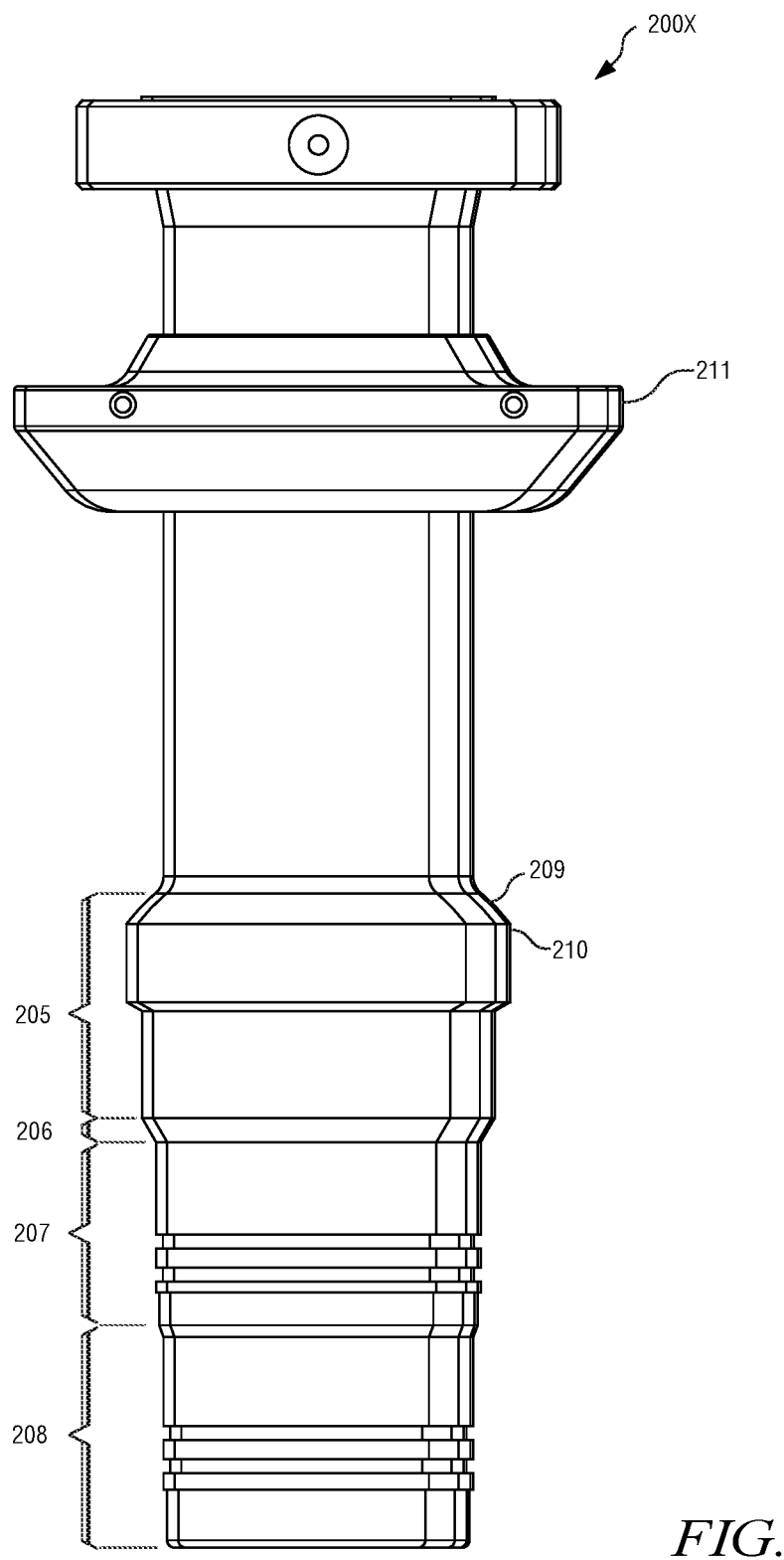
FIG. 18 is similar to FIG. 3, except that FIG. 18 depicts fluid connection adapter 200X including release collar 211 and configured for an exemplary adapter release embodiment.
Figure 19:
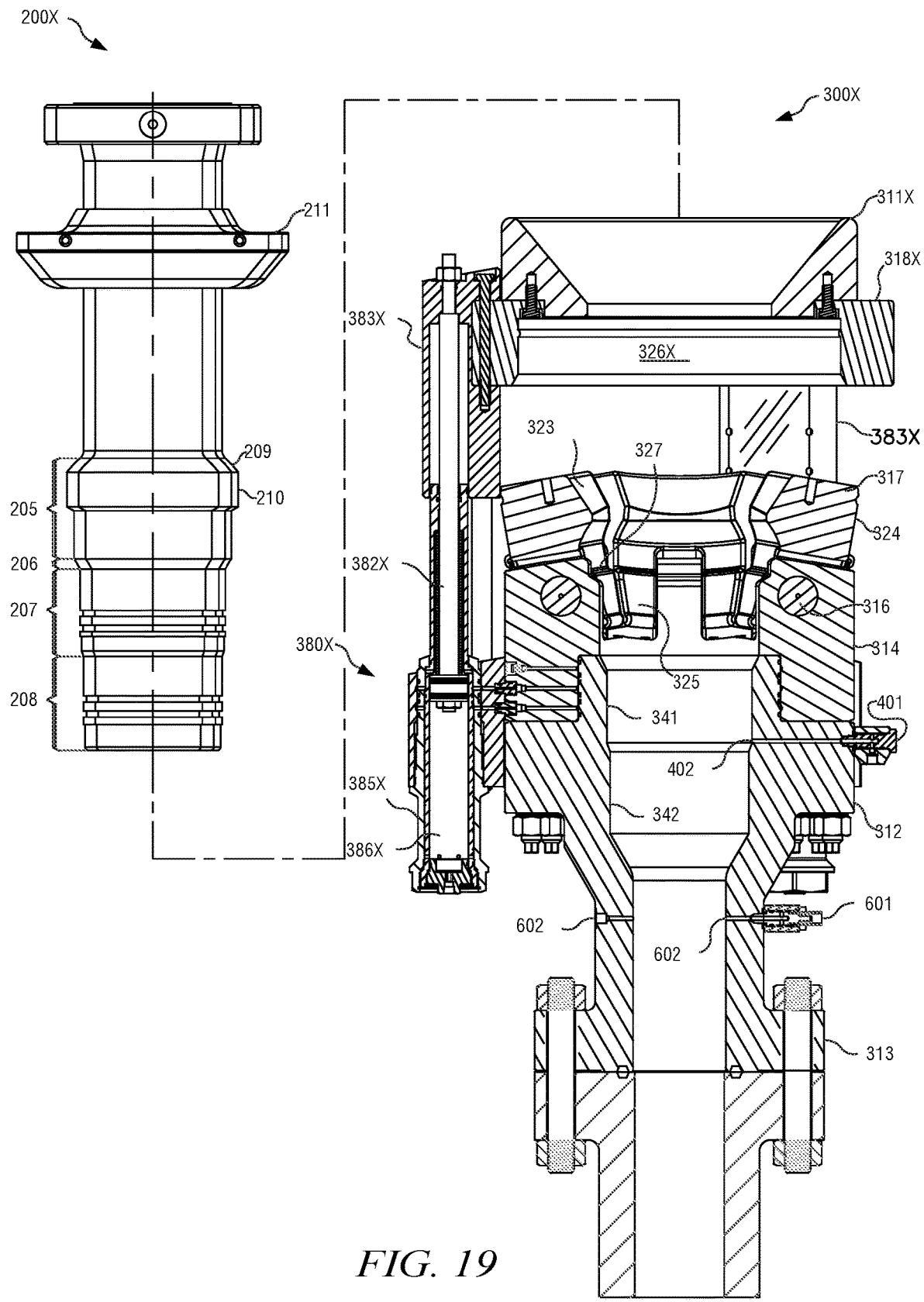
FIG. 19 is similar to FIG. 6, except that FIG. 19 depicts fluid connection adapter 200X and fluid connection housing assembly 300X configured in an exemplary adapter release embodiment.

In more detail, FIGS. 18 and 19 are similar to FIGS. 3 and 6, except that FIGS. 18 and 19 depict fluid connection adapter 200X and fluid connection housing assembly 300X configured in an exemplary adapter release embodiment. FIG. 18 is an elevation view of fluid connection adapter 200X. Fluid connection adapter 200X includes enlarged OD section 205, locking element actuating section 206, first seal section 207, second seal section 208, tapered lock engagement surface 209 and rib 210 as previously described with reference to FIG. 3. Fluid connection adapter 200X on FIG. 18 also includes release collar 211. As will be described, release collar 211 is for contact engagement with guide funnel 311X on FIG. 19. Release collar 211 is thus positioned, shaped and sized on fluid connection adapter 200X for such contact engagement with guide funnel 311X. In preferred embodiments, release collar 211 is provided in annular parts (such as two semicircular parts) that may be fixed around fluid connection adapter 200X at a desired location via screw clamping. In other embodiments, release collar 211 may be attached to fluid connection adapter 200X via set screws, heat shrinking or welding. In other embodiments, release collar 211 and fluid connection adapter 200X may be a unitary workpiece.

FIG. 19 is a section view of fluid connection housing assembly 300X configured to receive fluid connection adapter 200X. Fluid connection adapter 200X is not in section on FIG. 19. Similar to FIG. 18, FIG. 19 shows fluid connection adapter 200X including enlarged OD section 205, locking element actuating section 206, first seal section 207, second seal section 208, tapered lock engagement surface 209, rib 210 and release collar 211. Similar to FIG. 6, FIG. 19 shows fluid connection housing assembly 300X including wellhead adapter 312, flanged connection 313, fluid connection housing 314, pivot pins 316, locking elements 317, locking element inner surface 323, locking element outer surface 324, locking element rocking surface 325, housing notch 327, first seal bore 341, second seal bore 342, quick test fitting 401, quick test port 402, needle valve 601 and transducer ports 602, all as shown and described above with reference to FIG. 6. Fluid connection housing assembly 300X on FIG. 19 also includes guide funnel 311X, locking ring 318X and locking ring inner surface 326X. Actuator assemblies 380X as shown on FIG. 19 each include actuator link 382X (for example, a piston), actuator housing 383X, actuator base 385X, and actuator cylinder 386X. As will be described in further detail below, guide funnel 311X, locking ring 318X and actuator assemblies 380X on FIG. 19 interoperate with release collar 211 on fluid connection adapter 200X to enable adapter release embodiments illustrated and described herein. In some adapter release embodiments, actuator assemblies 380X illustrated on FIG. 19 may provide a longer actuation stroke than, for example, counterpart actuator assemblies 380 as shown and described with reference to FIG. 6. The longer actuation stroke further facilitates adapter release functionality.

Figure 20:
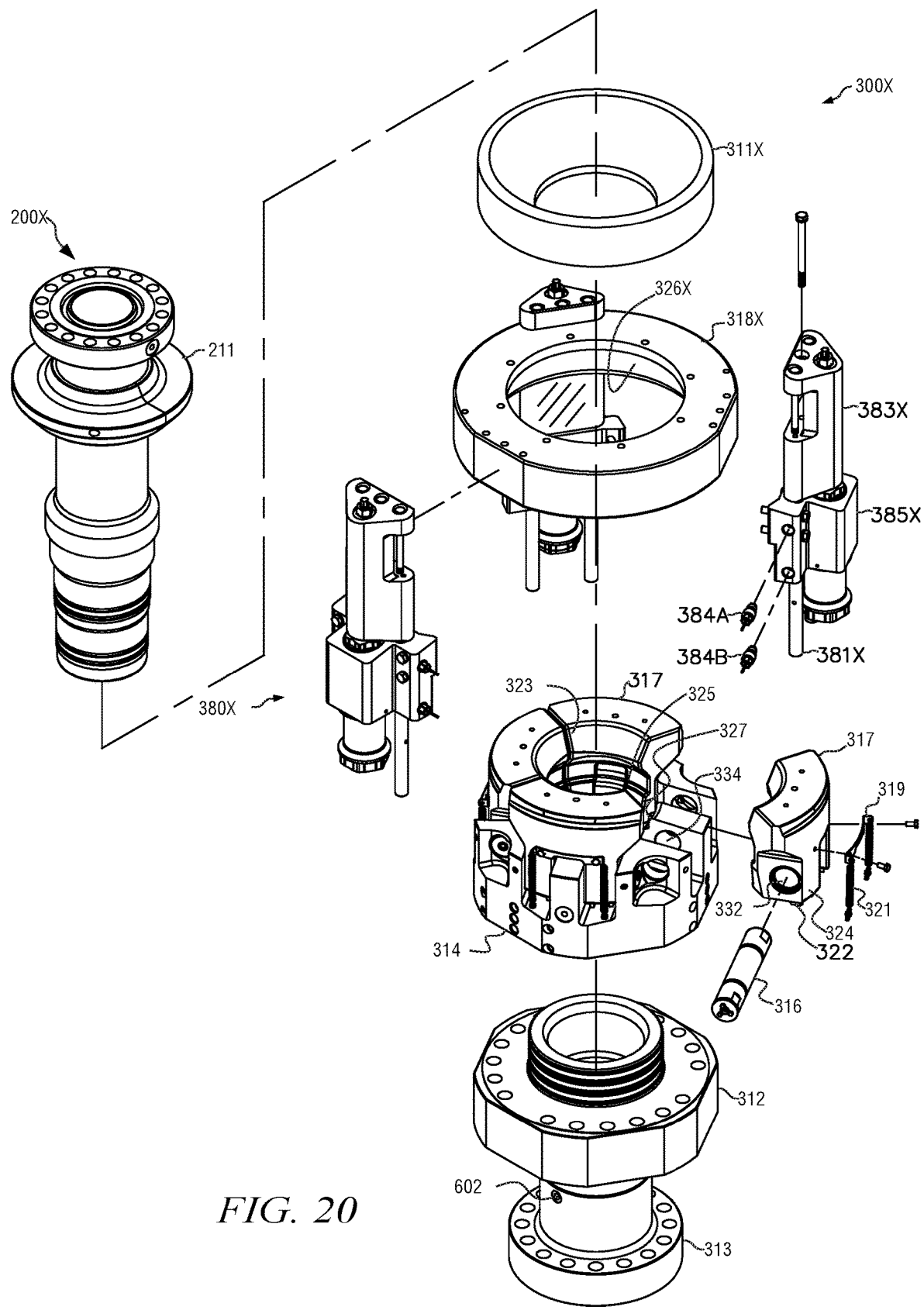
FIG. 20 is an exploded view similar to FIG. 5, except that FIG. 20 depicts fluid connection adapter 200X and fluid connection housing assembly 300X configured in an exemplary adapter release embodiment.

FIG. 20 is an exploded view similar to FIG. 5, except that FIG. 20 depicts fluid connection adapter 200X and fluid connection housing assembly 300X configured in an exemplary adapter release embodiment. Many of the same parts commonly depicted on FIG. 19 and FIG. 6 are also depicted on FIG. 20. Additionally, fluid connection housing assembly 300X on FIG. 20 shows straps 319, biasing elements 321 (such as tension springs, for example), rotation stops 322, locking element inner surfaces 323, locking element outer surfaces 324, locking element rocking surfaces 325, pin bores 332 and housing bores 334, all as shown and described above with reference to FIG. 5. Fluid connection housing assembly 300X on FIG. 20 also includes guide funnel 311X, locking ring 318X and locking ring inner surface 326X, as also shown on FIG. 19. Actuator assemblies 380X as shown on FIG. 20 each include guide rods 381X, actuator housing 383X, first sensor 384A, second sensor 384B, and actuator base 385X. As will be described in further detail below, first and second sensors 384A, 384B operate to allow a positional state of fluid connection adapter 200X to be determined and monitored during travel of fluid connection adapter 200X into and out from fluid connection housing assembly 300X.

FIGS. 21A through 21H are sequential "freeze frame" views illustrating various positional states during entry, engagement, release and exit of fluid connection adapter 200X into and out from fluid connection housing assembly 300X in an exemplary adapter release embodiment. FIGS. 21A through 21D correspond to FIGS. 7A through 7D as illustrated and described above for fluid connection embodiments without an adapter release. Fluid connection adapter 200X enters fluid connection housing assembly 300X, and then locks into fluid connection housing assembly 300X on FIGS. 21A through 21C essentially the same way fluid connection adapter 200 enters fluid connection housing assembly 300, and then locks into fluid connection housing assembly 300 on FIGS. 7A through 7C. Refer to description above associated with FIGS. 7A through 7C for details. Likewise, internal pressure IP displaces fluid connection adapter 200X into tighter restraint against fluid connection housing assembly 300X on FIG. 21D essentially the same way internal pressure IP fluid displaces fluid connection adapter 200 into tighter restraint against fluid connection housing assembly 300 on FIG. 7D. Also, the presence of internal pressure IP urges first and second seal sections 207, 208 on fluid connection adapter 200X to expand radially to make tighter contact with first and second seal bores 341, 342 on fluid connection housing assembly 300X, thereby enhancing the seals formed therebetween. Again, refer to description above associated with FIG. 7D for additional details.

FIGS. 21E through 21H are sequential "freeze frame" views illustrating various positional states during release and exit of fluid connection adapter 200X from fluid connection housing assembly 300X in an exemplary adapter release embodiment. Prior description associated with FIGS. 7A through 7D noted that fluid connection adapter 200's disengagement from fluid connection housing assembly 300 was essentially the reverse operation of engagement. FIGS. 21E through 21H illustrate that disengagement of fluid connection adapter 200X from fluid connection housing assembly 300X in adapter release embodiments is not essentially a reverse operation of engagement. FIGS. 21E through 21H illustrate additional disengagement aspects and features once internal pressure IP is removed.

Figure 21D:
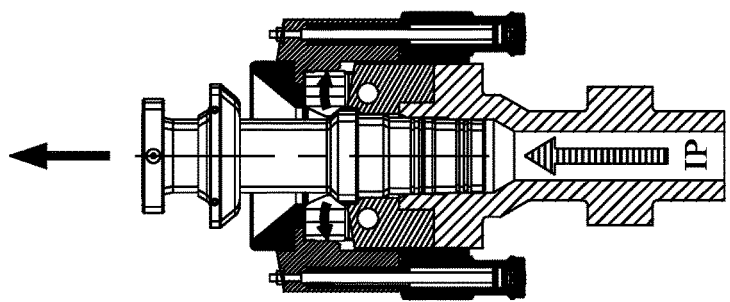
Figure 21C:
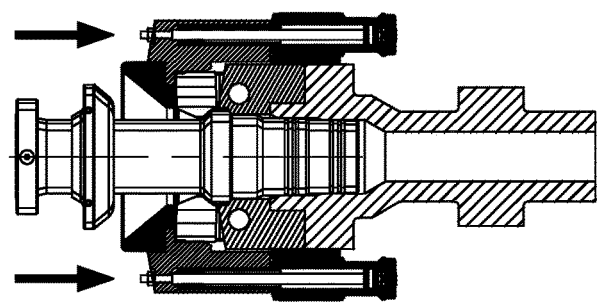

The sequential "freeze frame views of FIGS. 21A through 21H will now be described in more detail. Fluid connection adapter 200X on FIGS. 21A through 21H includes release collar 211. Release collar 211 is configured on fluid connection adapter 200X to stand sufficiently proud so as to be capable of being contacted by guide funnel 311X on fluid connection housing assembly 300X. FIG. 21A illustrates embodiments in which, in an operational mode, fluid connection adapter 200X is free and may be inserted into guide funnel 311X when guide funnel 311X is in an extended state (via guide funnel connection to locking ring 318X in an extended state). Guide funnel 311X, in an extended state, is thus disposed to support fluid connection adapter 200X by the release collar 211. In these embodiments, engagement of release collar 211 on guide funnel 311X may help to center fluid connection adapter 200X in fluid connection housing assembly 300X in preparation for locking and seal engagement. Further, in these embodiments, retraction of guide funnel 311X (via retraction of locking ring 318X) may bring fluid connection adapter 200X smoothly and predictably into fluid connection housing assembly 300X for locking, and for seal engagement between first and second seal sections 207, 208 and first and second seal bores 341, 342.

In other embodiments, in an operational mode, guide funnel 311X and locking ring 318X may be sufficiently retracted so that guide funnel 311X does not support fluid connection adapter 200X by release collar 211. In such other embodiments, fluid connection adapter 200X may be inserted into fluid connection housing assembly 300X via gravity or an external downward pushing force.

Figure 21B:
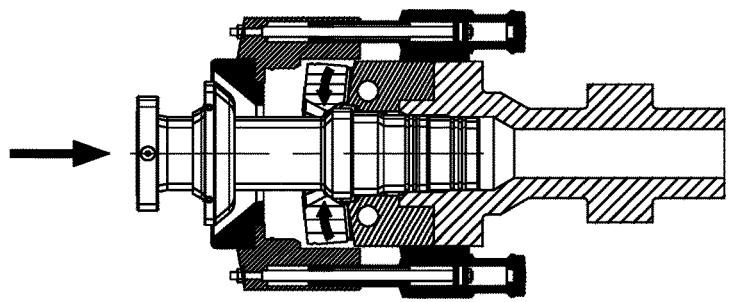
Figure 21A:
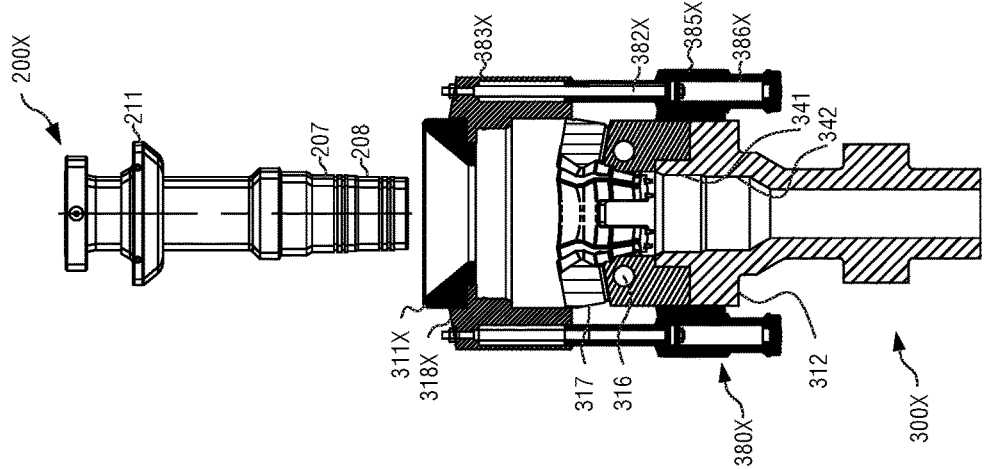

FIG. 21B illustrates an adapter release embodiment in a "sealed" positional state, in which fluid connection adapter 200X has been inserted into fluid connection housing assembly 300X and a seal has been established between first seal section 207 and first seal bore 341, and second seal section 208 and second seal bore 342.

FIG. 21C illustrates an adapter release embodiment in a "locked" positional state per prior disclosure with reference to FIGS. 7A through 7C. It will be understood generally with reference to FIGS. 21A through 21D that adapter release embodiments lock and seal in essentially the same way as described above with reference to FIGS. 7A through 7D. Refer to counterpart prior description associated with FIGS. 7A through 7D. Note also that release collar 211 on fluid connection adapter 200X on FIGS. 21A through 21D is not in play in locking and seal engagement.

FIG. 21D illustrates an adapter release embodiment in a "pressurized" positional state per prior disclosure with reference to FIG. 7D. Refer to counterpart prior description associated with FIG. 7D.

FIG. 21E illustrates depressurization of an adapter release embodiment, in which internal pressure IP as shown on FIG. 21D has been removed. Locking elements 317 may displace as shown on FIG. 21E responsive to depressurization.

FIG. 21F illustrates an adapter release embodiment moving to an "unlocked" positional state. Locking ring 318X is extended until locking ring 318X no longer restrains locking element outer surfaces 324. Locking element inner surfaces 323 are free to rotate and completely disengage from tapered lock engagement surfaces 209 on fluid connection adapter 200X, such that fluid connection adapter 200X is free to be withdrawn from fluid connection housing assembly 300X. Note that a prior-established seal between first seal section 207 and first seal bore 341, and/or between second seal section 208 and second seal bore 342 is not broken in the "unlocked" positional state illustrated on FIG. 21F. The "unlocked" positional state on FIG. 21F disposes the seal as "available to be broken" without breaking the seal. FIG. 21F depicts the limit of the "unlocked" positional state where locking ring 318X is extended until guide funnel 311X contacts (but does not displace) release collar 211 on fluid connection adapter 200X.

FIG. 21G illustrates an adapter release embodiment moving to a "released" (or "unsealed") positional state. Locking ring 318X is extended so that guide funnel 311X displaces release collar 211 on fluid connection adapter 200X (and thereby separates fluid connection adapter 200X from fluid connection housing assembly 300X). Separation of fluid connection adapter 200X from fluid connection housing assembly 300X breaks any prior-established seal between first seal section 207 and first seal bore 341, and/or between second seal section 208 and second seal bore 342. Fluid connection adapter 200X is now free and available to be lifted clear of fluid connection housing assembly 300X in this "released" (or "unsealed") positional state according to FIG. 21G.

FIG. 21H illustrates an adapter release embodiment moving to an optional, additional "proffered" positional state to assist further subsequent retrieval of fluid connection adapter 200X from fluid connection housing assembly 300X. Locking ring 318X is extended further so that guide funnel 311X separates fluid connection adapter 200X further from housing assembly 300X (via further displacement of release collar 211 on adapter 200X). This action, as shown on FIG. 21H, proffers fluid connection adapter 200X clear of fluid connection housing assembly 300X and holds adapter 200X steady to be lifted clear if desired.

As noted above, in some adapter release embodiments, actuator assemblies 380X illustrated on FIGS. 21A through 21H may provide a longer actuation stroke than, for example, counterpart actuator assemblies 380 as shown and described with reference to FIGS. 7A through 7D. The longer actuation stroke in such adapter release embodiments provides sufficient extension and retraction of locking ring 318X (and guide funnel 311X) on FIGS. 21A through 21H to enable, for example, a "free" positional state such as illustrated on FIG. 21A, or a "released" positional state such as illustrated on FIG. 21G, or a "proffered" positional state such as illustrated on FIG. 21H.

FIGS. 22A through 22H are partial, enlarged views corresponding to FIGS. 21A through 21H, allowing the "freeze frame" views of FIGS. 21A through 21H to be understood in more detail. Refer to description above associated with FIGS. 21A through 21H.

Figure 22D:
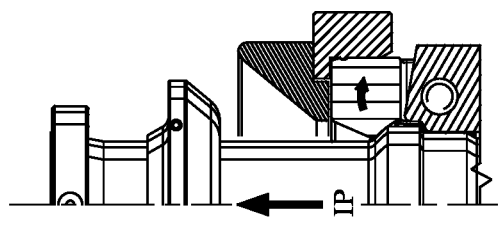
FIGS. 22A through 22H are partial, enlarged views corresponding to FIGS. 21A through 21H, allowing the "freeze frame" views of FIGS. 21A through 21H to be understood in more detail.
Figure 22C:
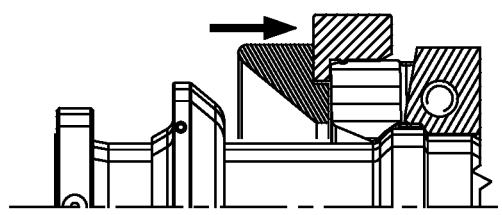
Figure 22B:
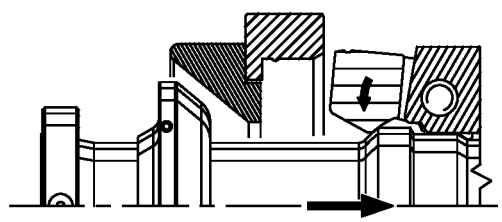
Figure 22A:
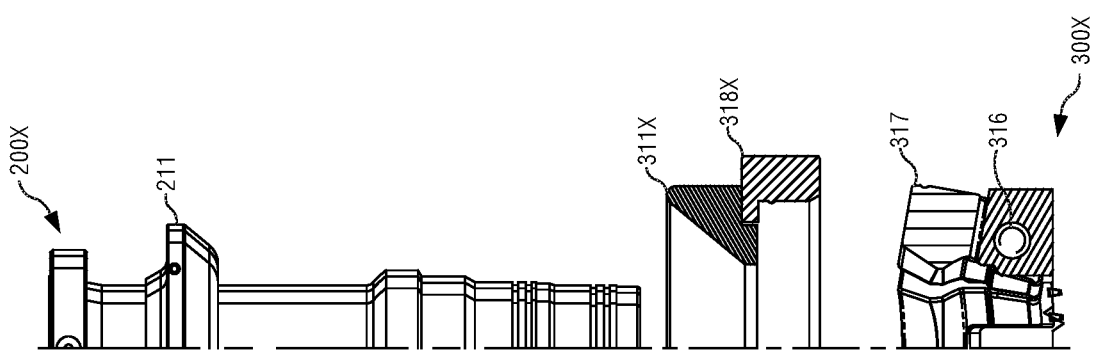
Figure 22H:
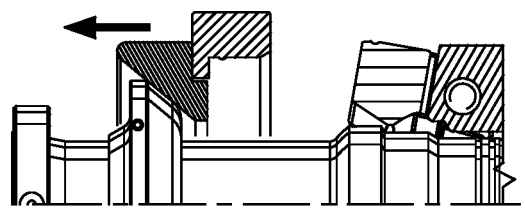
Figure 22G:
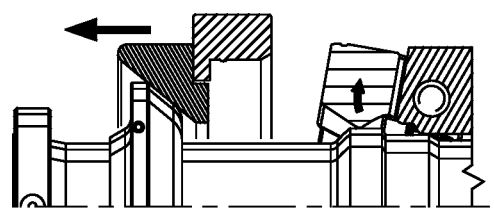
Figure 22F:
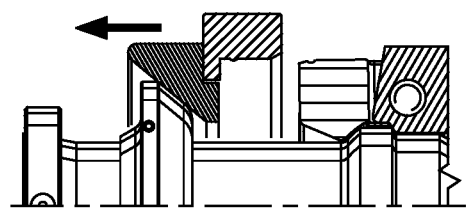
Figure 22E:
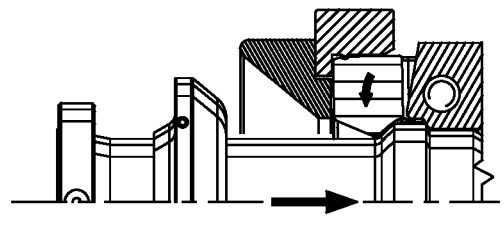
Figure 23:
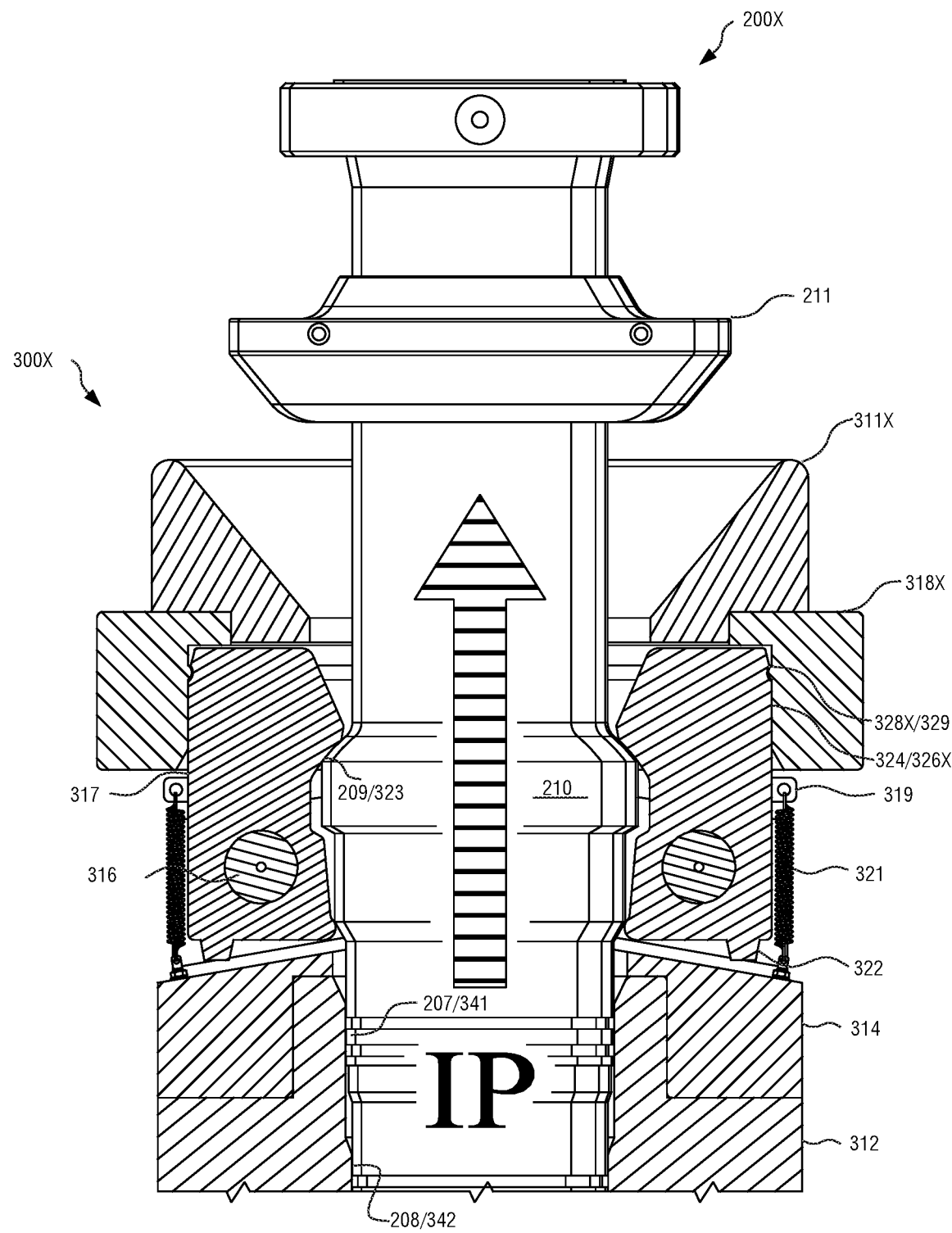
FIG. 23 is an enlarged view corresponding to FIG. 21D and FIG. 22D, depicting fluid connection adapter 200X and fluid connection housing assembly 300X in a locked and pressurized state.

FIG. 23 is an enlarged view corresponding to FIG. 21D and FIG. 22D, depicting fluid connection adapter 200X and fluid connection housing assembly 300X in a locked and pressurized state. Refer to description above associated with FIGS. 21C and 21D.

Figure 24A:
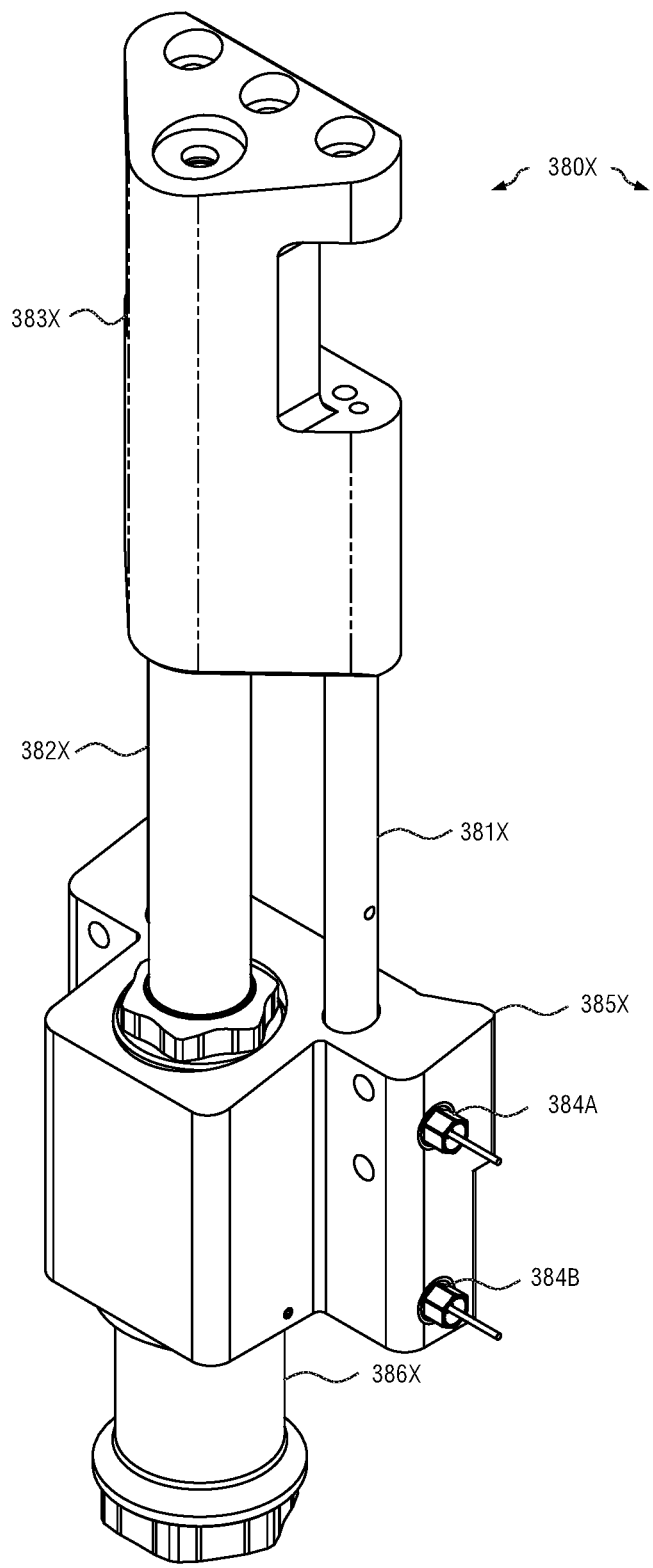
FIGS. 24A and 24B depict details of an embodiment of actuator assembly 380X configured to determine and monitor selected positional states during entry, engagement, release and exit of fluid connection adapter 200X into and out from fluid connection housing assembly 300X.
Figure 24B:
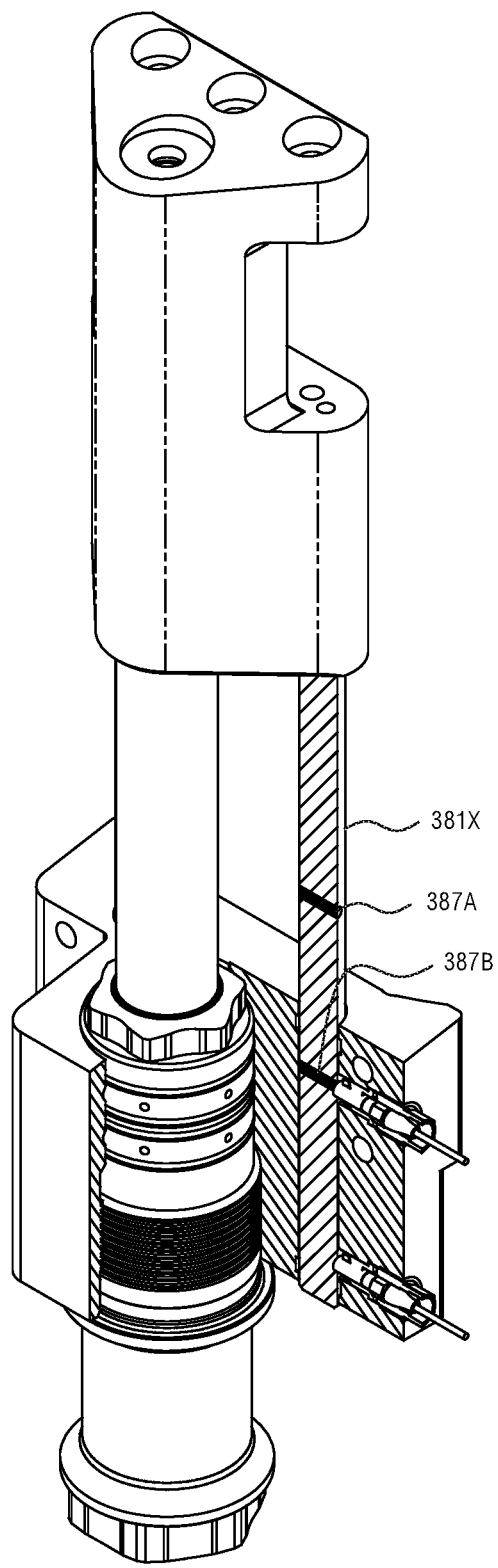

FIGS. 24A and 24B depict details of an embodiment of actuator assembly 380X which may be deployed in adapter release embodiments. Actuator assembly 380X on FIGS. 24A and 24B is configured to determine and monitor selected positional states during entry, engagement, release and exit of fluid connection adapter 200X into and out from fluid connection housing assembly 300X. FIGS. 24A and 24B should be viewed together. FIGS. 24A and 24B illustrate actuator assembly 380X including guide rods 381X, actuator link 382X (for example, a piston), actuator housing 383X, first sensor 384A, second sensor 384B, actuator base 385X, actuator cylinder 386X, first sensed portion 387A and second sensed portion 387B.

The mechanical and hydraulic operation of actuator assembly 380X on FIGS. 24A and 24B is essentially the same for actuator assembly 380 as described above with reference to FIGS. 14 and 15. Actuator assemblies 380X may be hydraulically-actuated piston assembles in which actuator links 382X extend and retract out from and back into actuator cylinder 386X. Guide rods 381X run essentially parallel to the travel of actuator links 382X to keep such travel rigid and straight under operational loads. In illustrated embodiments, two (2) guide rods 381X are provided for each actuator assembly 380X, although the scope of this disclosure is not limited in this regard.

Referring momentarily to FIG. 19, for example, actuator housings 383X are rigidly connected to locking ring 318X and actuator bases 385X are rigidly connected to fluid connection housing 314. In other, non-illustrated embodiments, actuator housings 383X may be rigidly connected to guide funnel 311X. Returning to FIGS. 24A and 24B, hydraulic extension and retraction of actuator links 382X within actuator cylinders 386X correspondingly displaces locking ring 318X and guide funnel 311X with respect to fluid connection housing 314. Note also description above with reference to FIG. 19, in which, in some adapter release embodiments, actuator assemblies 380X may provide a longer actuation stroke than, for example, counterpart actuator assemblies 380 as shown and described with reference to FIGS. 14 and 15.

FIG. 24B illustrates actuator assembly 380X on FIG. 24A cut away to reveal first and second sensors 384A, 384B disposed to interact with first and second sensed portions 387A, 387B on at least one guide rod 381X. FIG. 24B illustrates an example of the positional determination and monitoring by first and second sensors 384A, 384B that will be described more comprehensively below with reference to FIGS. 25A through 25D. Actuator assemblies 380X on FIGS. 24A and 24B illustrate actuator link 382X in an extended position corresponding to locking ring 318X on FIG. 19 being in the fully "extended" position. FIG. 24B shows that first sensor 384A is positioned on guide rod 381X so that first sensor 384A detects the presence of second sensed portion 387B when actuator link 382X is in a fully extended position such that locking ring 318X is also in a fully extended position.

FIGS. 25A through 25D are sequential "freeze frame" views illustrating exemplary positional states of actuator assembly 380X during entry, seal and lock of fluid connection adapter 200X with respect to fluid connection housing assembly 300X. Refer also to FIGS. 21A through 21C and FIGS. 22A through 22C and associated description for discussion of the entry, seal and lock of fluid connection adapter 200X with respect to fluid connection housing assembly 300X.

FIG. 25A is essentially the same view as shown in FIGS. 24A and 24B. Actuator assembly 380X on FIG. 25A shows actuator link 382X in an extended position corresponding to locking ring 318X on FIG. 19 being in the fully extended position. Referring momentarily to FIGS. 21A and 21H, a fully extended locking ring 318X corresponds to "free" and "proffered" positional states. FIG. 25A shows that first sensor 384A is positioned on guide rod 381X so that first sensor 384A detects the presence of second sensed portion 387B when actuator link 382X is in a fully extended position. First sensor 384A thus detects either a "free" or "proffered" positional state.

FIG. 25B shows that first sensor 384A is positioned on guide rod 381X so that first sensor 384A detects the presence of first sensed portion 387A and second sensor 384B detects the presence of second sensor 387B when actuator link 382X is in a first partially-retracted (or first partially-extended) position. FIG. 25B corresponds to FIGS. 21B and 21F in a sealed but unlocked positional state, such that fluid connection adapter 200X may either be inserted into or withdrawn from fluid connection housing assembly 300X. With additional reference to FIG. 21B, FIG. 25B also corresponds to fluid connection adapter 200X inserted into fluid connection housing assembly 300X and ready for locking.

FIG. 25D shows that first sensor 384A is positioned on guide rod 381X so that second sensor 384B detects the presence of first sensed portion 387A when actuator link 382X is in a fully retracted position. FIG. 25D corresponds to FIG. 21C in a locked positional state with locking ring 318X fully retracted.

FIG. 25C shows that neither of first and second sensors 384A, 384B detect the presence of a sensed portion 387A or 387B. Actuator link 382X on FIG. 25C is in a second partially-retracted (or second partially-extended) position, corresponding to being in transition between positional states, such as between FIGS. 25B and 25D (between unlocked and locked), for example.

It will thus be appreciated from FIGS. 24A through 25D that selected positional states on FIGS. 21A through 21H may be determined and monitored depending on the condition of first and second sensors 384A, 384B with respect to first and second sensed portions 387A, 387B. The specific positional states detected and monitored with reference to FIGS. 25A through 25D are exemplary only, and the scope of this disclosure is not limited to the specific positional states that may be available to be detected and monitored by embodiments of actuator assembly 380X with multiple sensors and sensed portions. In currently preferred embodiments, first and second sensors 384A, 384B are magnetic sensors. In such magnetic sensor embodiments, guide rods 381X on which first and second sensed portions 387A, 387B are deployed are preferably made from a non-ferrous material such as stainless steel, and first and second sensed portions 387A, 387B are ferrous portions in the stainless steel guide rod 381X (such as a ferrous steel grub screw or rivet). The scope of this disclosure is not limited, however, to the type of sensor deployed for first and second sensors 384A, 384B, or the manner in which the sensors are activated.

FIGS. 24A and 24B each depict currently preferred embodiments of actuator assembly 380X providing two (2) guide rods 381X, with only one guide rod 381X addressed by first and second sensors 384A, 384B. In other (non-illustrated) embodiments, actuator assembly 380X may provide two (2) guide rods 381X configured to be addressed by first and second sensors 384A, 384B in order to provide redundancy in case of sensor failure. The scope of this disclosure, however, is not limited to any embodiments including specific guide rod and sensor redundancy.

Earlier description made clear that the scope of this disclosure in no way limits the described fluid connection design embodiments and associated seal embodiments to specific sizes or models. Currently envisaged embodiments make the disclosed technology available in several sizes, shapes, and pressure ratings to adapt to desired applications. Proprietary connections may require specialized adapters. It will be nonetheless understood that the scope of this disclosure is not limited to any particular sizes, shapes, and pressure ratings for various embodiments thereof, and that the embodiments described in this disclosure and in U.S. provisional patent application Ser. No. 62/649,008 (incorporated herein by reference) are exemplary only.

Currently envisaged embodiments of the fluid connection designs (and associated seals) provide pressure ratings up to and including at least 15,000 psi MAWP. Currently envisaged sizes include internal diameters up to and including at least 8" ID. The foregoing sizes and performance metrics are exemplary only, and the scope of this disclosure is not limited in such regards.

Although fluid connection embodiments and associated seal embodiments have been described in this disclosure with reference to an exemplary application in hydraulic fracturing, pressure control at a wellhead, alternative applications could include, for example, areas such as subsea connections, deep core drilling, offshore drilling, methane drilling, open hole applications, well pressure control, wireline operations, coil tubing operations, mining operations, and various operations where connections are needed under a suspended or inaccessible load (i.e., underwater, hazardous area). The scope of this disclosure is not limited to any particular application in which the described fluid connections may be deployed.

Exemplary materials used in the construction of the disclosed embodiments include high strength alloy steels, high strength polymers, and various grades of elastomers.

Although the material in this disclosure has been described in detail along with some of its technical advantages, it will be understood that various changes, substitutions and alternations may be made to the detailed embodiments without departing from the broader spirit and scope of such material as set forth in the following claims.

We claim:

1. A fluid connection assembly, comprising:
a fluid connection adapter having first and second adapter ends, the fluid connection adapter providing a raised lock engagement surface and an adapter release collar on an external surface of the fluid connection adapter, the fluid connection adapter further providing at least a first seal section;
a fluid connection housing assembly having first and second housing ends, the fluid connection housing assembly providing a displaceable locking ring, a plurality of locking elements, and at least a first seal bore;
wherein each locking element is disposed to constrict radially;
wherein each locking element has a locking element outer surface and a locking element inner surface;
wherein, during entry of the second adapter end into the first housing end, the first seal section sealingly contacts the first seal bore, wherein the first seal section is disposed to expand radially such that when the first seal section expands radially, the first seal section further tightens sealing contact against the first seal bore;
wherein engagement of the locking ring on the locking element outer surfaces causes the locking element inner surfaces to retain the fluid connection adapter via the lock engagement surface; and
wherein engagement of the locking ring on the adapter release collar causes the first seal section to release sealing contact with the first seal bore.

2. The fluid connection assembly of claim 1, in which each locking element is disposed to constrict radially via rotation about a corresponding pivot pin, and in which the locking elements are disposed to rotate during entry of the second adapter end into the first housing end such that the locking element inner surfaces oppose the lock engagement surface.

3. The fluid connection assembly of claim 2, in which, responsive to displacement of the locking ring, progressive engagement of a locking ring inner surface on the locking element outer surfaces maintains opposing tapers between the locking element inner surfaces and the lock engagement surface.

4. The fluid connection assembly of claim 3, in which the locking element inner surfaces are disposed to tighten against the lock engagement surface responsive to displacement of the second adapter end towards the first housing end during engagement of the locking ring inner surface on the locking element outer surfaces.

5. The fluid connection assembly of claim 1, in which the first seal section is disposed to expand radially responsive to introduction of internal pressure within the second adapter end.

6. The fluid connection assembly of claim 1, in which the fluid connection housing assembly further provides a quick test port, the quick test port comprising a fluid passageway from a fluid connection housing assembly exterior through to the first seal bore.

7. The fluid connection assembly of claim 1, in which the second adapter end further includes a strengthening sleeve.

8. A fluid connection assembly, comprising:
a fluid connection adapter having first and second adapter ends, the fluid connection adapter providing a raised lock engagement surface and an adapter release collar on an external surface of the fluid connection adapter, the fluid connection adapter further providing at least a first seal section;
a fluid connection housing assembly having first and second housing ends, the fluid connection housing assembly providing a displaceable locking ring, a guide funnel, a plurality of locking elements, and at least a first seal bore;
wherein the guide funnel is attached to the locking ring;
wherein each locking element is disposed to constrict radially;
wherein each locking element has a locking element outer surface and a locking element inner surface;
wherein, during entry of the second adapter end into the first housing end, the first seal section sealingly contacts the first seal bore, wherein the first seal section is disposed to expand radially such that when the first seal section expands radially, the first seal section further tightens sealing contact against the first seal bore;
wherein engagement of the locking ring on the locking element outer surfaces causes the locking element inner surfaces to retain the fluid connection adapter via the lock engagement surface; and
wherein engagement of the guide funnel on the adapter release collar causes the first seal section to release sealing contact with the first seal bore.

9. The fluid connection assembly of claim 8, in which each locking element is disposed to constrict radially via rotation about a corresponding pivot pin, and in which the locking elements are disposed to rotate during entry of the second adapter end into the first housing end such that the locking element inner surfaces oppose the lock engagement surface.

10. The fluid connection assembly of claim 9, in which, responsive to displacement of the locking ring, progressive engagement of a locking ring inner surface on the locking element outer surfaces maintains opposing tapers between the locking element inner surfaces and the lock engagement surface.

11. The fluid connection assembly of claim 10, in which the locking element inner surfaces are disposed to tighten against the lock engagement surface responsive to displacement of the second adapter end towards the first housing end during engagement of the locking ring inner surface on the locking element outer surfaces.

12. The fluid connection assembly of claim 8, in which the first seal section is disposed to expand radially responsive to introduction of internal pressure within the second adapter end.

13. The fluid connection assembly of claim 8, in which the fluid connection housing assembly further provides a quick test port, the quick test port comprising a fluid passageway from a fluid connection housing assembly exterior through to the first seal bore.

14. A fluid connection assembly, comprising:
- a fluid connection adapter having first and second adapter ends, the fluid connection adapter providing a raised lock engagement surface and an adapter release collar on an external surface of the fluid connection adapter, the fluid connection adapter further providing at least a first seal section;
- a fluid connection housing assembly having first and second housing ends, the fluid connection housing assembly providing a displaceable locking ring, a plurality of locking elements, and at least a first seal bore; and
- an actuation assembly, wherein the actuation assembly is configured to extend and retract the locking ring such that sensors on the actuation assembly determine and monitor positional states of the locking ring;
- wherein each locking element is disposed to constrict radially;
- wherein each locking element has a locking element outer surface and a locking element inner surface;
- wherein, during entry of the second adapter end into the first housing end, the first seal section sealingly contacts the first seal bore, wherein the first seal section is disposed to expand radially such that when the first seal section expands radially, the first seal section further tightens sealing contact against the first seal bore;
- wherein engagement of the locking ring on the locking element outer surfaces causes the locking element inner surfaces to retain the fluid connection adapter via the lock engagement surface; and
- wherein engagement of the locking ring on the adapter release collar causes the first seal section to release sealing contact with the first seal bore.

15. The fluid connection assembly of claim 14, in which each locking element is disposed to constrict radially via rotation about a corresponding pivot pin, and in which the locking elements are disposed to rotate during entry of the second adapter end into the first housing end such that the locking element inner surfaces oppose the lock engagement surface.

16. The fluid connection assembly of claim 15, in which, responsive to displacement of the locking ring, progressive engagement of a locking ring inner surface on the locking element outer surfaces maintains opposing tapers between the locking element inner surfaces and the lock engagement surface.

17. The fluid connection assembly of claim 16, in which the locking element inner surfaces are disposed to tighten against the lock engagement surface responsive to displacement of the second adapter end towards the first housing end during engagement of the locking ring inner surface on the locking element outer surfaces.

18. The fluid connection assembly of claim 14, in which the first seal section is disposed to expand radially responsive to introduction of internal pressure within the second adapter end.

19. The fluid connection assembly of claim 14, in which the fluid connection housing assembly further provides a quick test port, the quick test port comprising a fluid passageway from a fluid connection housing assembly exterior through to the first seal bore.

20. The fluid connection assembly of claim 14, in which the second adapter end further includes a strengthening sleeve.

* * * * *